United States Patent
Suganuma

[11] Patent Number: 5,880,893
[45] Date of Patent: Mar. 9, 1999

[54] OBJECTIVE LENS AND RECORDING/ REPRODUCING APPARATUS

[75] Inventor: Hiroshi Suganuma, Ibaragi, Japan

[73] Assignee: Sony Corporation, Tokyo, Japan

[21] Appl. No.: 937,029

[22] Filed: Sep. 24, 1997

[30] Foreign Application Priority Data

Sep. 26, 1996 [JP] Japan ................................ 8-255047

[51] Int. Cl.$^6$ .................................................. G02B 13/18
[52] U.S. Cl. ............................................ 359/717; 359/719
[58] Field of Search ................................... 359/708, 717, 359/718, 719, 713, 714, 715, 716

[56] References Cited

U.S. PATENT DOCUMENTS

| | | | |
|---|---|---|---|
| 5,467,225 | 11/1995 | Manabe | 359/717 |
| 5,475,537 | 12/1995 | Kobayashi et al. | 359/717 |
| 5,491,587 | 2/1996 | Iwaki et al. | 359/717 |
| 5,734,512 | 3/1998 | Shin et al. | 359/717 |

*Primary Examiner*—Scott J. Sugarman
*Attorney, Agent, or Firm*—Hill & Simpson

[57] ABSTRACT

A object of the present invention is to provide an objective lens that two non spherical surfaces are combined and a numeral aperture is more than 0.7, and to provide an optical pick-up apparatus which can be used for an optical recording medium having high information recording density by using this objective lens.

There is disclosed that a first surface is a rotating ellipse surface (a cone constant k: $-1 \leq k < 0$), and curvature of the first surface, glass materials (refractive index) of a first lens 1 and a main plane interval d of the total of combination of two lenses are properly established to satisfy the fixed relational expression.

6 Claims, 20 Drawing Sheets

OBJECTIVE LENS AND RECORDING/REPRODUCING APPARATUS

BACKGROUND OF THE INVENTION

1. Field of the Invention

The present invention belongs to a mechanical field relating to an objective lens and a recording/reproducing apparatus for recording/reproducing an information signal to an optical recording medium such as an optical disc having the objective lens.

2. Description of the Related Art

Conventionally, an optical recording medium such as an optical disc is widely used due to mass-production and low cost for reserving data such as moving picture information, voice information, data for a computer. Recently, high density and large capacity is requested more and more because an information-oriented society is sharply progressing.

In order to improve recording density of the optical recording medium, both of a short wavelength of a flux of light for reading out an information signal and a high numeral aperture of an objective lens (using the objective lens having the high numeral aperture) for collecting the flux of light on the respective optical recording medium are effective.

The NA of the objective lens for so-called "a compact disc (CD)" (a digital optical disc for an audio signal or computer data) is 0.45, on one hand, the NA of the objective lens for so-called "a digital video disc (DVD)" (a digital optical disc for a video signal) the recording density of which is improved rather than "the compact disc" is 0.6.

The objective lens for these optical disc is formed as a non spherical single lens (a single ball non spherical lens) made of synthetic resin and glass materials.

"The digital video disc (DVD)" has a disc substrate which is 0.6 mm thick that is a half of the thickness of the disc substrate of "the compact disc" and an optical magnetic disc in order to reduce influence of comatic aberration due to a gradient of the disc.

In the oon spherical single lens having the numeral aperture (NA) higher than that used at present.

One of reasons is processing of metallic mold. That is to say, when the gradient of the surface of the lens is larger than 45 degrees as reference is vertical to an optical axis, it is hard to process the non spherical metallic mold due to a size of an end of a diamond cutting tool. Further, the sharper curvature is, the larger depth (called "sag") in the direction of the optical axis from the top of the lens to the outest circumference is, therefore, the cutting processing of the metallic mold is hard.

If the processing is possible, in an area that the numeral aperture (NA) is rather than 0.7 as an single lens, high degrees aberration correction higher than 7 degrees is essential. Further more free degrees of design are necessary for it. Though it is considered to make use of a higher degrees non spherical coefficient for correction it, it is hard to process and design, therefore, it is not an effective means.

Under these circumferences, though the non spherical lens the numeral aperture (NA) of which is more than 0.8 is reported as the design, there is no report that the lens the numeral aperture of which is larger than 0.7 is made as a single lens.

On the other hand, the lens having the high numeral aperture that the numeral aperture is larger than 0.7 used for a conventional microscope and so on is a combination lens including plural of spherical lenses for which plural kinds of glass materials are used. From an optical similarity between the microscope and an optical pick-up apparatus for the optical disc, it is easily considered to apply the same lens as that for the microscope for the optical lens of the respective pick-up lens. Further, at the dawn to make the optical lens practicable, the combination lenses including two groups of three spherical lenses were used.

However, these combination lenses are necessary to be precisely assembled, and unstable performance and high cost is inevitable.

This problem has been solved by the non spherical mold single lens. In the non spherical mold lens, not only it is possible to obtain the non spherical form having high precision, but also it is not necessary to assemble due to a single ball and it is possible to obtain sufficient tolerance to decentering and falling. However, in the non spherical mold single lens, as above mentioned, it is difficult to make the non spherical single lens having the numerical aperture (NA) higher than that used at present.

SUMMARY OF THE INVENTION

The present invention is proposed considering the actual situation, and solves problems to realize an objective lens having a numeral aperture higher than 0.7 as a combination of two non spherical surface lens and make an optical recording medium having high information recording density practicable by using the objective lens in a recording/reproducing apparatus.

Here, as the recording/reproducing apparatus is an apparatus for mass production, particularly it is necessary to manufacture and assemble easily and structure should be simple. Further, as an optical pick-up apparatus executes focusing and tracking action by servo-controlling a position of the objective lens, it is the most important problem to make the objective lens small and light for not only making a product small but also advancing performance.

The non spherical form is shown as a rotating body around the optical axis of a curve as shown by following expression:

$$x = \frac{ch^2}{1 + \sqrt{(1 - (1+k)c^2h^2)}} + Ah^4 + Bh^6 + Ch^8 + Dh^{10} \quad \text{[expression 11]}$$

where the non spherical form of a surface of a lens system is defined as follows:

h: Height from an Optical Axis x: A distance from a tangent plane of the non spherical top of a point on a non spherical surface that height from an optical axis is h.

c: Curvature of the non spherical top (Inverse Number of Radius of Curvature (1/R))

k: A Cone Constant

A: A Non spherical Coefficient of the Fourth degree

B: A Non spherical Coefficient of the Sixth deof the Tenth degree,

C: A Non spherical Coefficient of the Eighth degree

D: A Non spherical Coefficient of the Tenth degree,

The non spherical form is classified by the cone constant k as follows:

k<-1: A Hyperbolic Surface k=-b 1: A Parabolic Surface k>-1: A Ellipse Surface (<0: the x axis is a major axis, >0: the x axis is a minor axis.)

k=0: A Spherical Surface.

Further, a distance such as a surface interval of each surface forming the lens system is a positive number when any distance is on the side of an image of each surface and a negative number when any distance is on the side of an object of each surface. The radius of curvature of the surface is positive when the center of curvature of the surface is on the side of the image of each surface and negative when it is on the side of the object of each surface. Further, refractive force is positive when the center of curvature of the surface is on the side of the image of each surface and is negative when it is on the side of the object of each surface.

The objective lens according to the present invention, in order to solve sad problem, includes a first lens disposed on the side of an object and having a first surface on the side of the object and a second surface on the side of an image, and a second lens disposed on the side of the image and having a third surface on the side of the object and a fourth surface on the side of image;

wherein the respect first surface has positive refractive power and a rotating ellipse surface satisfying $-1 \leq k < 0$ about a cone constant k, and the following expression is satisfied:

$$n - 1.25 < \frac{d}{F} \quad \text{[expression 12]}$$

$$0.5 < \frac{F}{R_1} < \frac{n^2}{n^2 - 1} \quad \text{[expression 13]}$$

$$0.6 R_1 < d < \frac{-(n-1)\frac{F}{R_1} + n}{(n-1)\frac{F}{R_1} \left[ (n-1)(n^2 - n - 1)\frac{F}{R_1} + 1 \right]} \quad \text{[expression 14]}$$

wherein:
n is the respective refractive index of glass materials which the respective first lens includes;
$R_1$ is the radius of curvature of the first surface;
d is the main plane interval of the total of the each lens and
F is an effective focal distance.

Further, the present invention provides the objective lens, wherein the second surface is a rotating ellipse surface which has the negative refractive power and that the cone constant k is larger than 0, the third surface is the rotating ellipse surface which has the positive refractive power and that the cone constant k is larger than −1 and less than 0, and a numeral aperture is larger than 0.7.

Further, the present invention provides the objective lens, wherein the following expressions are satisfied:

$$\frac{d_2}{F} < 0.1 \quad \text{[expression 15]}$$

$$0.8 < n_1 d_1 \frac{n_1 - 1}{R_1} < 1.3 \quad \text{[expression 16]}$$

wherein a surface interval $d_1$ is between the first and the second surface and $d_2$ is between the second and the third surface.

Further, the recording/reproducing apparatus according to the present invention includes a light source and an objective lens and the objective lens is the objective lens according to the present invention.

Further, the present invention, in the recording/reproducing apparatus, a scue detecting means for detecting a gradient of the objective lens of a signal recording surface of an optical recording medium to an optical axis.

Further, the present invention provide the recording/reproducing apparatus, wherein the recording/reproducing apparatus supports the signal recording surface and is used for the optical recording medium that a transparent substrate positioned between the signal recording surface and the objective lens is less than 0.6 mm thick.

DESCRIPTION OF THE PREFERRED EMBODIMENTS

Embodiments of the present invention will be described below with reference to the accompanying drawings.

[1] Outline of Architecture of an Objective Lens

[2] Analysis of Power Arrangement and Derivation of Optimum Requirement of a Lens by the Aberration Theory

[2-1] The aberration theory by thick single lens approximation
  (1) Paraxial relation in thick single lens approximation
  (2) Spherical aberration of thick single lens approximation
  (3) Comatic aberration in the neighborhood of a thick lens (4) Optimum curvature of a first surface and an optimum main plane interval of the total system by thick single lens approximation

[2-2] Paraxial arrangement considering decentering

[2-3] Paraxial arrangement considering working distance as doublet

[2-4] Necessary requirement of paraxial arrangement derived from thick single lens approximation

[3] Decentering non sensitive requirement by thickness optimization of a first element

[4] Example of variation

[1] Outline of Architecture of an Objective Lens

Figure 1:
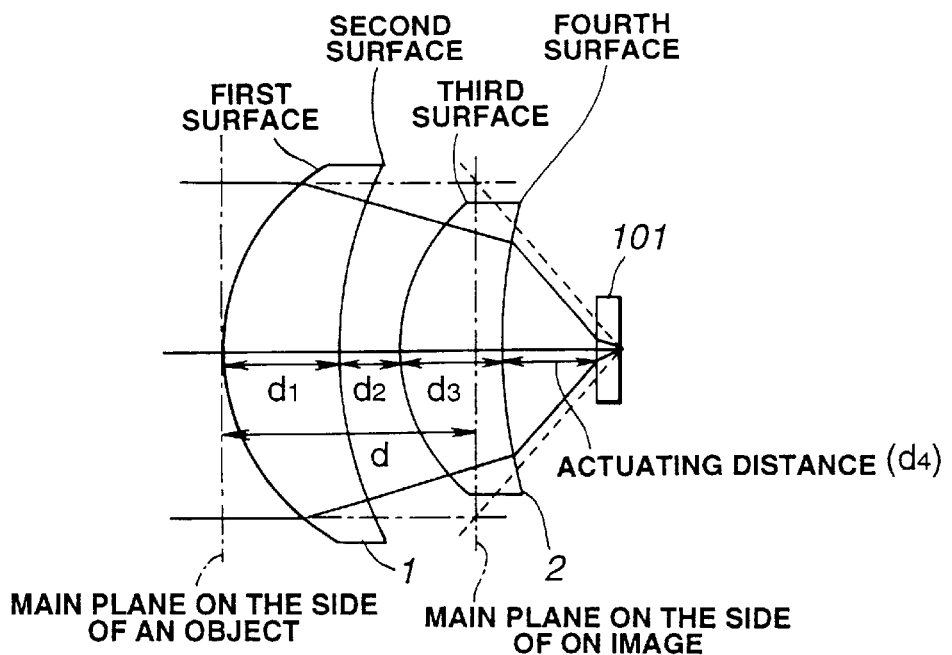
FIG. 1 is a side view showing configuration of an objective lens relating to the present invention.

An objective lens relating to the present invention, as shown in FIG. 1, a non spherical doublet lens and a high numeral aperture objective lens that the numeral aperture is more than 0.7. That is to say, this objective lens includes a first element 1 which is a first lens disposed on the side of an object and a second element 2 which is a second lens disposed on the side of an image. In the objective lens, a first surface faced to the side of the object is the rotating ellipse surface which has positive refracting power and that a cone constant k is more than −1 and less than 0, a second surface is the rotating ellipse surface which has negative refracting power and that the cone constant k is more than 0, and a third surface is the rotating ellipse surface which has positive refracting power and that the cone constant k is more than −1 and less than 0.

When the first surface of the objective lens is a diaphragm, as main light passes though the center of the respective first surface, height of an image is 0, so comatic aberration does not occur due to a non spherical term. Therefore, it is understood that the non spherical surface of the first surface contributes mainly to correction of the spherical aberration.

Particulary, in the objective lens relating to the present invention, as the first surface has large power, the large spherical aberration occurs due to the spherical term here. In order to correct properly it, the surface may be the rotating ellipse surface that the non spherical cone constant of the first surface is more than −1 and less than 0. Without this range, correction should be executed by the non spherical coefficient of other surface, in this case, the non spherical coefficient is large and a form is hard to be processed.

In the second and the third surfaces, as incident angles of incident fluxes are small and the light is scarcely refracted, large aberration does not occur. However, when the second and the third surfaces are nonsphericalized, it is possible to correct the higher order spherical and the comatic aberration. Particularly, it is effective that the second surface is symmetrically disposed to the four surface and the third surface is symmetrically disposed to the first surface to have the approximately inverted spherical and comatic aberration.

The fourth surface is inevitably decided when forms of the first through the third surface, glass materials which each element 1 and 2 includes, and thickness of a disc substrate (a transparent substrate) 101 of an optical recording medium (an optical disc) are decided. In order to make the fourth surface to a processable form and to secure sufficiently decentering tolerance of the whole system, the second surface may be the rotating ellipse surface which has the negative refracting power and that the cone constant k is more than 0, and the third surface may be the rotary ellipse surface which has the positive refracting power and that the cone constant k is more than −1 and less than 0.

[2] Analysis of Power Arrangement and Derivation of Optimum Requirement of a Lens by the Aberration Theory

[2-1] The aberration theory by thick single lens approximation

It is possible to discuss quantitatively about the argument in [1] (Outline of Configuration of an Objective Lens). In order to design the lens having the high numeral apertures securin necessary to optimize its power arrangement. As any higher-order aberration is a function of the lower-order aberration, it is necessary to control from the lower-order aberration. Because, when the lower-order aberration is canceled by occurring the higher-order aberration, it is hard to make the form of a surface and the manufacturing aberration becomes small.

Figure 2:
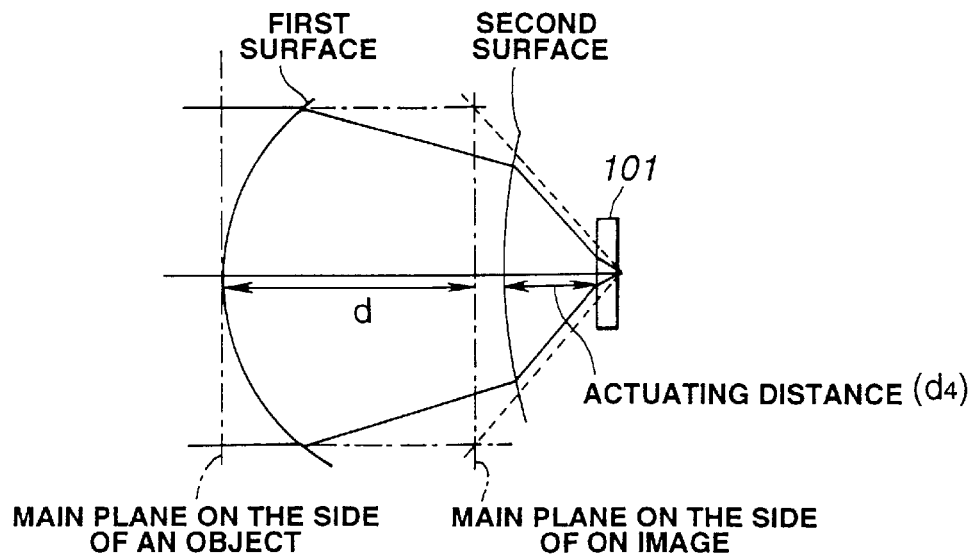
FIG. 2 is a side view showing that the objective lens is approximated to a thick single lens.

Though the present invention relates to the non spherical doublet lens, first as shown in FIG. 2, it is considered that the form and the main plane interval of the first surface are optimized by considering virtually the thick single lens that the surfaces after the second surface are composed to the first surface.

It may be considered that the main plane interval d of the thick single lens corresponds to the main plane interval d of the whole of the former non spherical doublet lens.

(1) Paraxial relation in thick single lens approximation

For example, in "Optics" (written by Hiroshi Kubota published by Iwanami-Shoten) and so on, the aberration theory of the thin single lenses including up to the nonspherical surface is described in detail. However, as these are thin approximation to the last, in order to analyze sufficiently an actual lens, it is necessary to expand it about the case of the thick lens. First, an aberration of the thick single lens (refractive index n, thickness d and effective focal length f) is found.

Radiuses of curvature of the first and the second surfaces of this single lens are $r_1$ and $r_2$ respectively, and height of incident light on the first and the second surfaces is $h_1$ and $h_2$ respectively. A distance between a point of intersection of the extension line of incident light on the first surface and an optical axis and the first surface is $s_1$, and a distance between a point of intersection of the extension line of the incident light on the second surface and an optical axis and the second surface is $s_2$. A distance betweesurface and an optical axis and the first surface is $s_1'$, and a distance between a point of intersection of the extension line of light after refracted by the second surface and an optical axis and the second surface is $s_2'$. The any amount is negative on the incident side and positive on the outgoing side of each surface. Then, power of the total lens is expressed as follows:

$$D = \frac{1}{f} = \frac{n-1}{r_1} + \frac{1-n}{r_2} - nd\frac{n-1}{r_1}\frac{1-n}{r_2} \quad \text{[expression 17]}$$

$$= (n-1)(\rho_1 - \rho_2) + n(n-1)^2 d\rho_1\rho_2$$

Further, $$\rho_1 = \frac{1}{r_1}, \rho_2 = \frac{1}{r_2}, D = \frac{1}{f} \quad \text{[expression 18]}$$

Refraction in paraxial approximation of the first and the second surface is given as follows:

$$\frac{n}{s_1} = \frac{1}{s_1'} + \frac{n-1}{r_1} \quad \text{[expression 19]}$$

$$\frac{n}{s_2} = \frac{1}{s_2'} + \frac{n-1}{r_2}$$

where $s_1$=infinity is substituted for [expression 19]:

$$\frac{1}{s_2} = \frac{n-1}{n} \rho_1 \qquad \text{[expression 20]}$$

Further, $$\frac{h_2}{h_1} = \frac{s_1 - d}{s_1} = 1 - d\rho_1 + \frac{d\rho_1}{n} \qquad \text{[expression 21]}$$

where $s_2 = s_1' - d$ and the expression of [expression 21] is substituted for [expression 19] and we find that:

$$\frac{1}{s_2} = \frac{n(n-1)\rho_1}{n - (n-1)\rho_1 d} + (1-n)\rho_2 \qquad \text{[expression 22]}$$

Next, Atsube zero variant Q is found:

$$Q = n\left(\frac{1}{r} - \frac{1}{s}\right) \qquad \text{[expression 23]}$$

$Q_{si}$ is the Atsube zero variant relating to a distance $s_i$ between the object front or back of the i-th surface and the surface, and $Q_{zi}$ is the Atsube zero variant relating to a distance $z_i$ between the object front or back of the i-th surface and the position of a diaphragm.

$$Q_{S1} = 1\left(\frac{1}{r_1} - \frac{1}{s_1}\right) = \rho_1 \qquad \text{[expression 24]}$$

$$Q_{S2} = 1\left(\frac{1}{r_2} - \frac{1}{s_2}\right) = n\rho_2 - \frac{n(n-1)\rho_1}{n - (n-1)d\rho_1}$$

$$Q_{Z2} \approx 1\left(\frac{1}{r_2} - \frac{1}{z_2}\right) = n\rho_2 + \frac{n}{d}$$

Further, if the diaphragm is the first surface, as $z_i=0$, we find that:

$$\lim_{z_1 \to \infty} \frac{Q_{s1}}{Q_{z1} - Q_{s1}} = \lim_{z_1 \to \infty} \frac{\frac{1}{r_1} - \frac{1}{z_1}}{\frac{1}{s_1} - \frac{1}{z_1}} = 1 \qquad \text{[expression 25]}$$

where a new symbol $\Delta(1/ns)$ is substituted as follows:

$$\Delta\left(\frac{1}{ns}\right)_i = \frac{1}{n_i s_{oi}} - \frac{1}{n_i' s_{oi}'} \qquad \text{[expression 26]}$$

Then, we find that:

$$\Delta\left(\frac{1}{ns}\right)_1 = \frac{1}{s_1} - \frac{1}{ns_1'} = \frac{n-1}{n^2} \rho_1 \qquad \text{[expression 27]}$$

$$\Delta\left(\frac{1}{ns}\right)_2 = \frac{1}{s_2} - \frac{1}{s_2'}$$

$$= \frac{1-n^2}{n} \cdot \frac{(n-1)\rho_1}{n - (n-1)d\rho_1} + (n-1)\rho_2$$

(2) Spherical aberration of thick single lens approximation

Using them, a spherical aberration coefficient A of a thick single lens is given as follows:

$$A = A_{onjective\ lens} + A_{disk} = (A_1 + A_2) + (A_3 + A_4) = \sum_{i=1}^{4} A_i \qquad \text{[expression 28]}$$

$$= \sum_{i=1}^{4} -\left(\frac{h_i}{h_1}\right)^4 Q_{si}^2 \Delta\left(\frac{1}{ns}\right)_i + \frac{\epsilon_i}{r_i^3}(n_i - n_i')$$

However, where $\epsilon_1$ is a cone constant of a nonsoherical surface of the i-th surface. The values which are found above are substituted for the above expression and the spherical aberration coefficient $A_1$ of the first surface is given as follows:

$$A_1 = \left(\frac{1}{n^2} + \epsilon_i\right)(n-1)\rho_1^3 \qquad \text{[expression 29]}$$

A spherical aberration coefficient $A_2$ of the second surface is given as follows:

$$A_2 = -(n-1)\left(\frac{n + (1-n)d\rho_1}{n}\right)^4 \times \qquad \text{[expression 30]}$$

$$\left[n^2\left(\rho_2 - \frac{(n-1)\rho_1}{n - (n-1)d\rho_1}\right)^2 \left(\rho_2 + \frac{(1-n^2)\rho_1}{nn - (n-1)d\rho_1}\right) + \epsilon_2\rho_2^3\right]$$

$$= -(n-1)\frac{n + (1-n)d\rho_1^2}{n^3}[n - (n-1)d\rho_1 \rho_2 - (n-1)\rho_1]^2 \times$$

$$[nn - (n-1)d\rho_1 \rho_2 + (1-n^2)\rho_1] -$$

$$(n-1)\left(\frac{n + (1-n)d\rho_1}{n}\right)^4 \epsilon_2\rho_2^3$$

Spherical aberration due to thickness of a disc is as follows:

$$A_{disk} = \frac{n^2 - 1}{n^2} \cdot \frac{d}{h_1^4} \theta^4 \qquad \text{[expression 31]}$$

The sum of [expression 29] through [expression 31] is the spherical aberration of the thick lens.

Here, it is preferred that the aberration of each surface is almost zero respectively. Under the ideal condition, though the aberration is corrected if the sum of the aberration coefficient of each surface is finally zero, actually manufacturing errors such as decentering and accuracy of surface occur. Then, if the aberration coefficient of each surface is small, it is possible to control variation due to the errors to some extend. Further, in a design, any surface is not influenced, therefore, it is easy to obtain high performance.

Then, the non spherical coefficient $\epsilon_1$ of the first surface may be in the neighborhood of $-1/n^2$ from [expression 29]. As many refractive indexes n of optical glass are distributed within almost from 1.4 to 1.8 within the visible light area, $\epsilon_1$ may be about from −0.3 to −0.5.

Further, in case of the second surface, though the spherical aberration is zero when en expression is as follows in [expression 30], a left side is smaller than a right side because of the following four reasons.

$$d\rho_1 = \frac{1n}{n-1} \qquad \text{[expression 32]}$$

Figure 4:
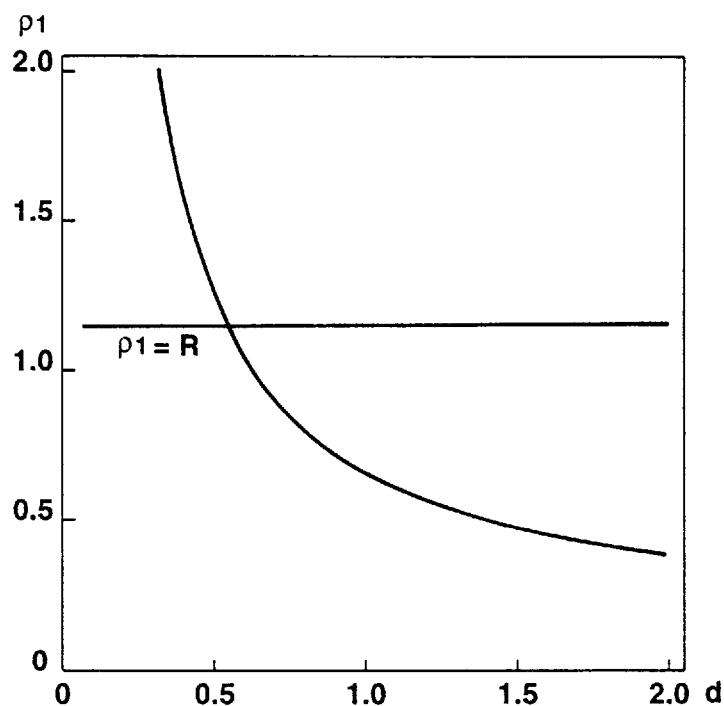
FIG. 4 is a graph showing distribution of spherical aberration of the thick single lens.
Figure 4:
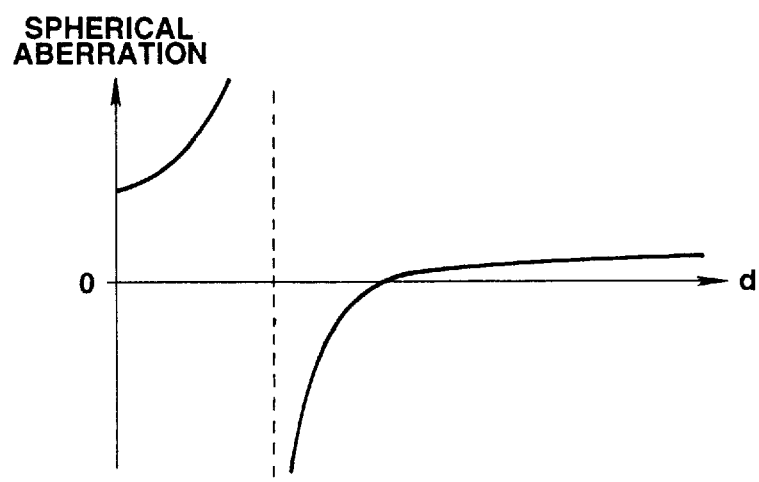
Figure 5:
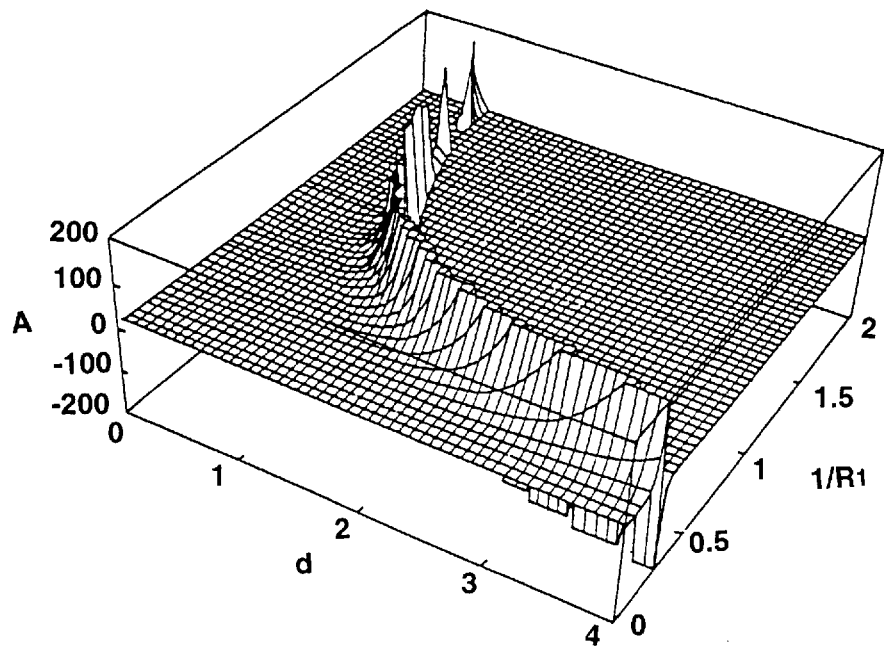
FIG. 5 is a graph showing three-dimensionally distribution of spherical aberration of the thick single lens.

First, in the optical disc, it is necessary to correct the spherical aberration (>0) caused by thickness of a disc substrate 101. Second, when the total spherical aberration coefficients of the thick lens are calculated as a function of curvature $\sigma_1$ (=1/$R_1$) of the first surface and the main plane interval d, as shown in FIG. 4 and 5, a gradient is too large in the neighborhood of the requirement of [expression 32]. That is to say, when the manufacturing error occurs in the curvature $\sigma_1$ of the first surface and the main plane interval d, the large spherical aberration occurs. Therefore, it is possible to obtain the stable solution which is easier to be manufactured by correcting the spherical aberration except this area by using the non spherical coefficient. Third, as below mentioned, from the point of view of correction of the comatic aberration, the curvature $\sigma_1$ of the first surface and the main plane interval d in the neighborhood of the requirement of [expression 32] are not preferred. Fourth, in $d\sigma_1 > n/(n-1)$, the radius of curvature $R_1$ of the first surface is small, it is hard to make as a lens the size of which is for the optical disc and it is impossible to secure a working distance. Therefore, the following expression should be satisfied:

$$d\rho_1 < \frac{n}{n-1} \qquad \text{[expression 33]}$$

In this case, though the spherical aberration of the second surface may be corrected by using the non spherical coefficient $\epsilon_2$, as it is possible to correct the non spherical term by a small value if the spherical aberration of the spherical term is as small as possible, it is advantage to manufacture. Therefore, in [expression 30], as follows:

$$\rho_2 = \frac{(n-1)\rho_1}{n - (n-1)d\rho_1} \qquad \text{[expression 34]}$$

By normalizing to f=1 and substituting for [expression 17], the following expression is found:

$$d = \frac{-(n-1)\rho_1 + n}{(n-1)\rho_1[(n-1)(n^2 - n - 1)\rho_1 + 1]} \qquad \text{[expression 35]}$$

In the area according the present invention within n=1.4 through 1.8 and within $\sigma_1$=0.5 through 1.9, the right side of [expression 35] is smaller than the right side of [expression 33]. Due to the same reason as that above mentioned, in this neighborhood, the following expression is preferred:

$$d < \frac{-(n-1)\rho_1 + n}{(n-1)\rho_1[(n-1)(n^2 - n - 1)\rho_1 + 1]} \qquad \text{[expression 36]}$$

(3) Comatic aberration in the neighborhood of a thick lens

Next, a comatic aberration coefficient B is found. B is found as follows:

$$B = \frac{Q_{z1}Q_{s1}}{Q_{z1} - Q_{s1}} \Delta\left(\frac{1}{ns}\right)_1 + \left(\frac{h_2}{h_1}\right)\frac{Q_{z2}Q_{s2}}{Q_{z2} - Q_{s2}} \Delta\left(\frac{1}{ns}\right)_2 \qquad \text{[expression 37]}$$

$$= \frac{n-1}{n^2}[-\rho_1^2 + (d\rho_2 + 1)(n-1)\rho_1 - n\rho_2 + d(n-1)\rho_1\rho_2$$

$$(n^2 - 1)\rho_1 - n^2\rho_2 + d(n^2 - 1)\rho_1\rho_2]$$

$$= \frac{n-1}{2}\rho_1^2[-1 + (n-1)(n^2 - 1)\rho_2^3(d - d_1)(d - d_2)(d - d_3)],$$

where the following numeral references are introduced:

$$d_1 = -\frac{1}{\rho_2} \qquad \text{[expression 38]}$$

$$d_2 = -\frac{(n^2-1)\rho_1 - n^2\rho_2}{(n^2-1)\rho_2\rho_2} = \frac{n^2}{n^2-1}\left[\frac{1}{\rho_1} - \frac{1}{\rho_2}\right]$$

$$d_3 = -\frac{(n-1)\rho_1 - n\rho_2}{(n-1)\rho_2\rho_2} = \frac{n}{n-1}\left[\frac{1}{\rho_1} - \frac{1}{\rho_2}\right]$$

$$d_1 < d_2 < d_3$$

Here, contribution of the nonsherical coefficient is neglected about the non spherical term. Further, as the disc substrate 101 is a parallel plane table, it may be considered that it does not contribute to the comatic aberration.

First, it is possible to find the $\sigma_1$ and $d_1$ about the special case from [expression 37]. That is to say, i) when $\sigma_1 \to 0$, if the total power of the lens is normalized to 1, $r_2$=1-n from [expression 17]. Then, $d_1$=n-1.

ii) Further, $\sigma_1$ that the comatic aberration is zero (B=0) in case of d=0 (thin approximation) is found as follows by substituting [expression 17] as D=1 for $\sigma_2$ of [expression 38]:

$$\rho_1 = \frac{n^2}{n^2 - 1} \qquad \text{[expression 39]}$$

Considering these special cases, behavior is examined how many numeral values of comatic aberration $\sigma_1$ is to d. General solution of d when the comatic aberration is 0 satisfies the following expression when B=0 in [expression 37]:

$$(d - d_1)(d - d_2)(d - d_3) = \frac{1}{(n-1)(n^2-1)\rho_2^3} \qquad \text{[expression 40]}$$

Therefore, a point of intersection of the three-dimensional curve of the [expression 40] and the constant of the right side is the solution of d that makes the comatic aberration 0. By calculating it, as shown in FIG. 6 and 7, the solution of d when B=0 exists on the boundaries of three areas A, B and C according to variation of $\sigma_1$.

Figure 6:
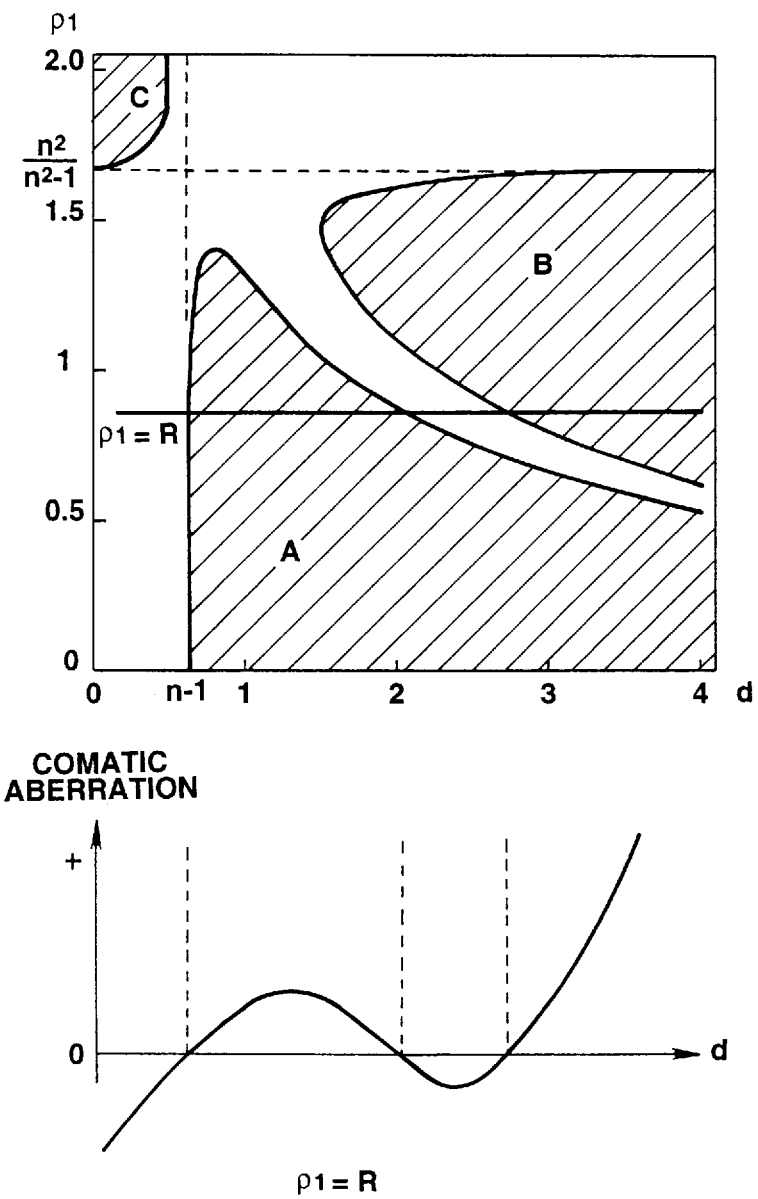
FIG. 6 is a graph showing distribution of comatic aberration of the thick single lens.
Figure 7:
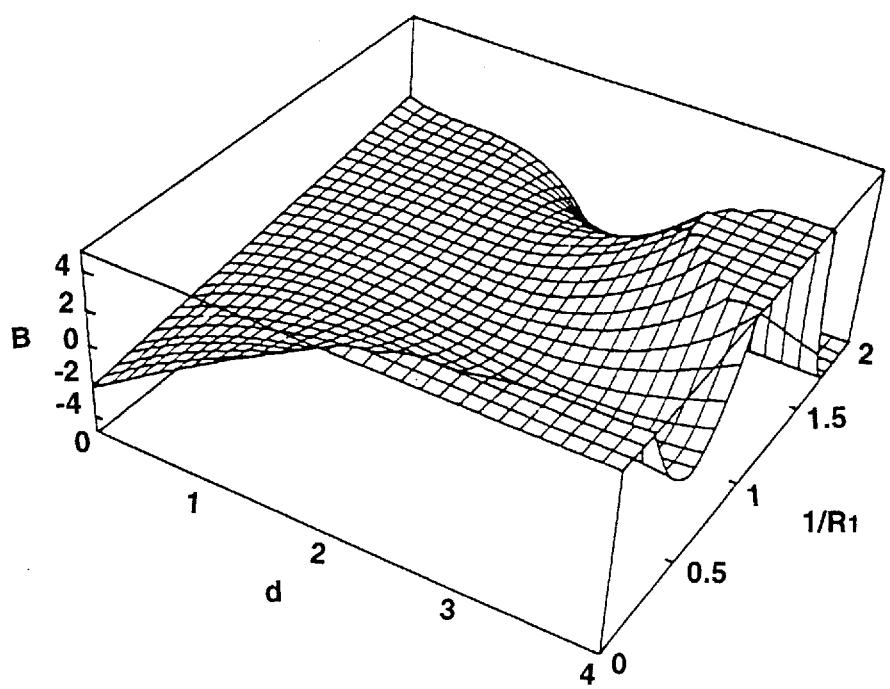
FIG. 7 is a graph showing three-dimensionally distribution of comatic aberration of the thick single lens.

The comatic aberration coefficients B are the positive values in the areas A, B and C as shown by oblique lines in FIG. 6. The area A is the areas that an asymptotic curve to d=n-1 is the lower bound of d. The area B is the area that an asymptotic curve to $\sigma_1 = n^2/(n^2-1)$ is the upper bound of $\sigma_1$. The area C is the is area surrounded by the curve that d=n-1 is the upper bound of d and $\sigma_1 = n^2/(n^2-1)$ is the lower bound of $\sigma_1$. On these boundaries of areas, the comatic aberration is 0. The area between the area A and area C is a saddle shape and comatic aberration is small.

Comparing to these three areas, it is understood that the most preferable one is the area A. As in the area B, the main plane interval d is longer than a focal distance, the lens is large-sized. As in the area C, the radius of curvature $R_1$ of the first surface is too small, it is hard to manufacture. Therefore, neighborhood of the boundary of the area A is preferred for correcting the comatic aberration. Further, in the glass materials for the visible light the refractive index of which is from 1.4 to 1.8, as above mentioned, it is understood that the area A is the most preferable from a point of view of the spherical aberration. Specifically, it is possible to correct sufficiently the comatic aberration if in the neighborhood of the boundary of the area A which is the lower bound of d and the upper bound of $\sigma_1$ respectively in the following expression:

$$n - 1.25 < d_1, \rho_1 < \frac{n^2}{n_2 - 1} \quad \text{[expression 41]}$$

Figure 8:
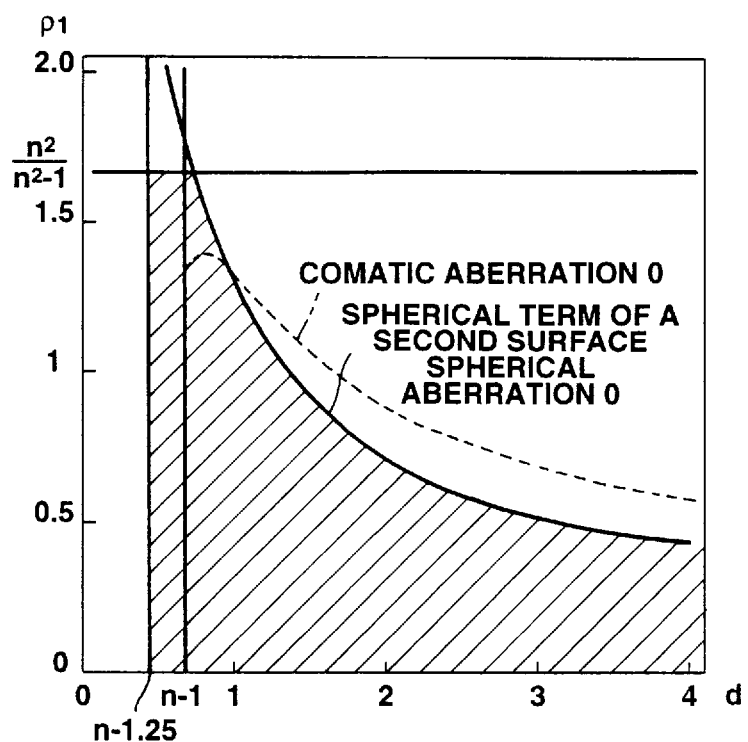
FIG. 8 is a graph showing an optimum area considered by the aberration theory.

(4) Optimum curvature of the first surface and optimum main plane interval of the total system by thick single lens approximation Illustrating the area of [expression 36] and [expression 41], as shown in FIG. 8, there is the optimum value considering from the aberration theory in the neighborhood of the boundary of the oblique line part in FIG. 8. For the reasons as above mentioned, as it is possible to control the comatic aberration small over the wide range of r1 in the neighborhood of $d=d_1=n-1$, there is a degree of freedom of design. Further, it means that tolerance is wide to $\sigma_1$, that is to say, errors of the curvature of the first surface. As practically this is the solution that d is smaller than that in the neighborhood of a hyperbola, it is the preferable solution in a use that small-size and light weight is desired.

The area that the comatic aberration is small is actually important. As shown in [Examples] as below described, it is easily possible to correct sufficiently the spherical aberration by the non spherical term. However, effect of the non spherical surface to the comatic aberration is not larger than that to the spherical aberration. Therefore, it is preferred that the comatic aberration itself by the spherical term is sufficiently corrected. Further, considering the case that the decentering occurs, the decentering comatic aberration is expressed as a function of the comatic aberration of the lower degree, the comatic aberration should be corrected from the lower degree to the higher degree.

[2-2] Paraxial arrangement considering decentering

More specifically, decentering comatic aberration that is occurred by decentering Ev of the v-th surface is given as follows ("The three-dimensional aberration theory of the optical system where decentering exists," written by Yoshiya Matsui published by Japan Optical Mechatronics Association):

$$\Delta Y = Y - \beta Y = -\frac{1}{2\alpha'} R^2 (2 + \cos 2\phi) \left( N \tan \omega \sum_\mu II\mu + Ev(IIE)v \right) \quad \text{[expression 42]}$$

where,

ΔY': Horizontal Magnification of Image Surface
Y': Height of Image
β: Horizontal Magnification
Y: Height of Object
α': Incident Angle on Image Surface of Object Paraxial Light
R: Entrance Pupil Radius Converted on Plane of Object
Φ: Addisma Angle at Entrance Pupil
N: Refractive Index of Object Field
ω: Angle between a straight line which connects an object point with a main point on the side of an object and a reference axis.
II$\mu$: A Comatic Aberration Coefficient of the $\mu$-th Surface
Ev: Decentering Amount of the v-th surface
IIEv: A Decentering Comatic Coefficient of the v-th surface.

Decentering comatic coefficient IIEv of the v-th surface is given as follows:

$$IIEv = \quad \text{[expression 43]}$$
$$\left( \alpha v / \sum_{\mu=v+1} II\mu - \alpha v \sum_{\mu=v} II\mu \right) - \left( \alpha v / \sum_{\mu=v+1} I\mu - \alpha v \sum_{\mu=v} I\mu \right)$$

where,

αv: An Incident Surface on the v-th Surface of Paraxial Ring Band Light
αv': An Outgoing Surface on the v-th Surface of Paraxial Ring Band Light
αv: An Incident Angle on the v-th surface of Paraxial Ring Band Light
αv': An Outgoing Angle on the v-th surface of Paraxial Ring Band Light
I$\mu$: A Spherical Aberration Coefficient of the $\mu$-th Spherical Surface
II$\mu$: A Comatic Aberration Coefficient of the $\mu$-th Spherical Surface As understood from [expression 43], the aberration of each surface should be sufficiently small from the point of view of decentering tolerance. Further, it is ideal that the aberration coefficients front and back of the surface that decentering easily occurs have symmetric aberration that cancel each other to the decentering.

In addition, both of the spherical and the comatic aberration should be secured sufficient tolerance to variation of curvature and the plane interval. In order to satisfy the requirement, the area in the neighborhood of $d=d_1$ is optimum.

In this area, variation of the spherical aberration is little to both of minute displacement of R and d. Further, the comatic aberration is small and it is possible to correct sufficiently by balance between the surfaces.

[2-3] Paraxial arrangement considering working distance as doublet

Generally, a position Δ' of a main point on the side of an image of a thick lens, as shown in FIG. 2, is found as a distance from a second surface as follows ("Lens Design Method," p.28 written by Yoshiya Matsui):

$$\Delta' = \frac{d \frac{n-1}{r_1}}{\frac{1}{f}} = d(n-1) \frac{f}{r^1} \quad \text{[expression 44]}$$

Normalizing as a focal distance is 1, a working distance WD is as follows:

$$WD = f - \Delta' = 1 - (n-1) \frac{d}{r_1} = 1 - (n-1) d\rho_1 \quad \text{[expression 45]}$$

$$\therefore d\rho_1 = \frac{1 - WD}{n - 1} \quad \text{[expression 46]}$$

Therefore, if refractive index n and a working lens WD ($d_4$ in FIG. 1) are decided, $d\sigma_1$ is fixed and a point on a hyperbola. When the working distance WD is 0, $d\sigma_1=1/(n-1)$. Generally, in a lens having a high numeral aperture, a focal distance is inevitably short because of. correcting aberration. As the working distance WD is short according to it, $d\sigma_1$ increases.

A lens according to the present invention is a doublet lens which has the high numeral aperture (NA), that is to say, NA is more than 0.7. However, as the maximum power is concentrated to a first surface, it is possible to understood characteristic by considering by approximating to a thick single lens similarly as above mentioned. In the high numeral aperture, $d\sigma_1$ should be as follows:

$$0.6 < d\rho_1 \quad \text{[expression 47]}$$

When $d\sigma_1$ is less than 0.6, it is hard to correct the comatic aberration outside an axis and a field of vision cannot help being remarkably narrow. If we want to correct it by making a non spherical surface, it is hard to make forms after the second surface. In the range of the [expression 47], the working distance WD of the thick single lens approximation is from about 0.55 to 0.7 times of a focal length when n is about 1.5, however, the working distance WD which is longer than thickness of a disc substrate 101 in case of an optical disc is necessary, therefore, even if the substantial working distance WD between the optical disc and an objective lens satisfy this requirement, in case that the focal length is less than 3 mm, it is only less than 1 mm.

When the power of the first surface is small, the power after the second surface increases, a radius of curvature is small, it is hard to process, a main plane interval d increases and the total length of lens is long, therefore, for practical use, the following expression is preferable:

$$0.5 < d\rho_1 \quad \text{[expression 48]}$$

[2-4] Necessary requirements of paraxial arrangement derived from thick single lens approximation From [expression 36], [expression 41], [expression 47] and [expression 48], the following expressions are found:

$$n - 1.25 < \frac{d}{F} \quad \text{[expression 49]}$$

$$0.5 < \frac{F}{R_1} < \frac{n^2}{n^2 - 1} \quad \text{[expression 50]}$$

$$0.6 R_1 < d < \frac{-(n-1)\frac{F}{R_1} + n}{(n-1)\frac{F}{R_1}\left[(n-1)(n^2 - n - 1)\frac{F}{R_1} + 1\right]} \quad \text{[expression 51]}$$

Figure 9:
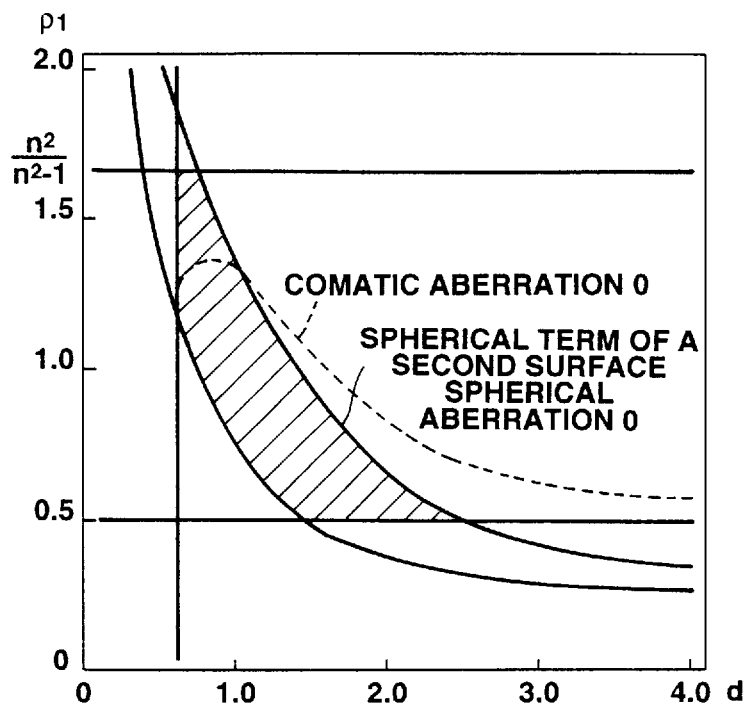
FIG. 9 is a graph showing an optimum area considering practicality as a high NA lens.

This area is illustrated within oblique lines in FIG. 9.

[3] Decentering non sensitive requirement by thickness optimization of a first element In practical use, it is preferred to satisfy the following requirements furthermore. When a surface interval between a first and a second surface is $d_1$ and the surface interval between the second and a third surface is $d_2$, expressions are as follows:

$$\frac{d_2}{F} < 0.1 \quad \text{[expression 52]}$$

$$0.8 < d_1 \frac{n-1}{R_1} < 1.3 \quad \text{[expression 53]}$$

The larger $d_2$ is, the longer the total length and the shorter a working distance WD due to concentrating of power to the first surface. Further, tolerance of the surface interval after the second surface is serious and spherical aberration easily occurs when manufacturing and assembling. Further, as the radius of a beam is small in a second element 2 and decentering between elements 1 and 2 is sensitive, decentering comatic aberration easily occurs. Therefore, a surface interval $d_2$ between the second and the third surface may be as small as possible.

Then, satisfying [expression 53] furthermore, contribution of power to the total system of the second the third surface is small. Therefore, as effect of the decentering of the second surface to the total system is small, the decentering tolerance is large. The reasons are as follows. Considering one thin lens by composing the second and the third surface, this objective lens is regarded as triplet. The power $\psi$ of the total system of three thin lenses (The power is $\psi_1$, $\psi_2$ and $\psi_3$, a surface interval between the first and the second surface is $d_1$, and a surface interval between the second and the third surface is $d_2$.) is expressed as follows:

$$\psi = \psi_1 + \psi_2(1 - d_1\psi_1) + \psi_3[1 - d_1\psi_1 - d_2\ \psi_2(1 - d_1\psi_1) + \psi_1] \quad \text{[expression 54]}$$

In [expression 54], any term including $\psi_2$ includes $(d_1\psi_1)$.

Therefore, when $1 - d_1\psi_1 = 0$; $\psi_2$ does not influence the power of the total system even if it is any value. Therefore, even if the decentering and falling occurs in the thin lenses, the total power arrangement is not changed, therefore, the aberration does not occur and the tolerance is spread. For practical use, if $1 - d_1\psi_1$ is in neighborhood of 0, it is possible to obtain sufficiently this effect. Considering an actual example of design, the sum of paraxes is about 1.0, if it is less than 0.8 or more than 1.3, the tolerance to the decentering of the second and the third surface is lost.

[4] Example of variation

Considering that the first and the second element are made of the same glass materials until now, they have been approximated as a thick single lens just like that and curvature $\sigma_1$ of the first surface and the main plane interval d has been discussed. In that case, as power of this doublet lens seriously depends on the first surface, n which has been used for discussing the thick single lens in the refractive index of the glass materials of the first element 1 may be substituted.

Further, the infinite-conjugate case that an object (that is, a light source) is infinite has beam treated until now. It is also possible to extend it to the case of a limited system in the range that the each expression is effective. However, in case of the limited system, it is hard to treat in case of the high numeral aperture (NA).

Figure 3:
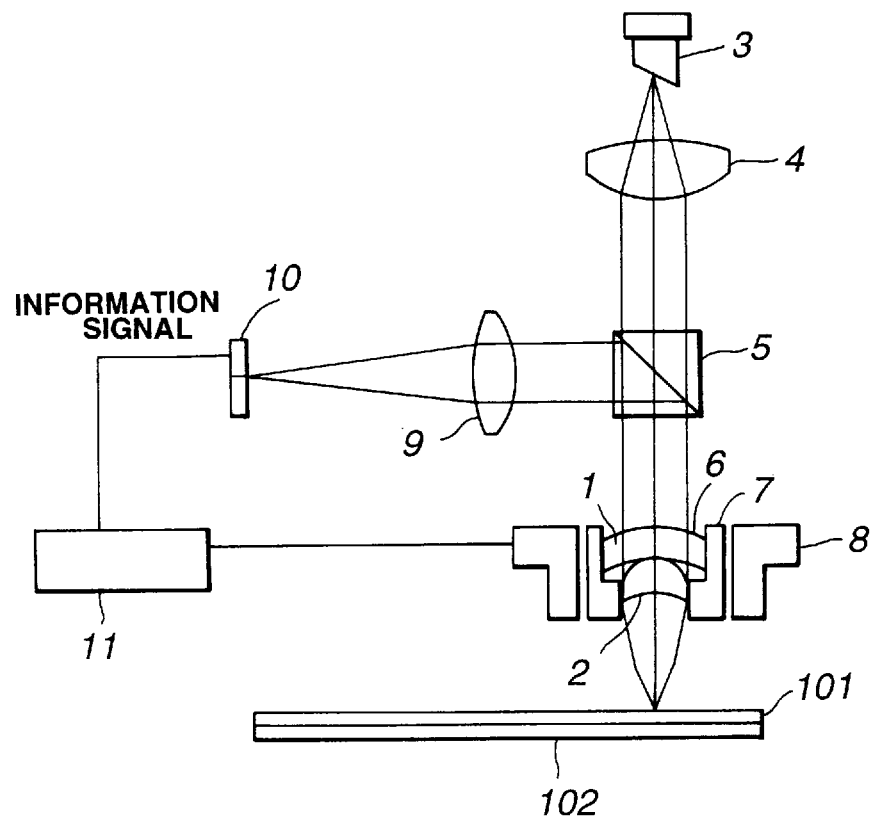
FIG. 3 is a side view showing configuration of a recording/reproducing apparatus relating to the present invention which is formed by the objective lens.

Further, it is possible to form an optical pick-up apparatus which is a main part of a recording/reproducing apparatus which records/reproduces an information signal to an optical recording medium by using the objective lens. That is to say, the optical pick-up apparatus, as shown in FIG. 3, has semiconductor laser 3 which is a light source, and collect fluxes of light radiated from the semiconductor laser 3 through the objective lens 6 on an optical disc 102 which is an optical recording medium. The fluxes of light radiated from the semiconductor laser 3 are almost in parallel by a collimator lens 4. The palallel fluxes of light penetrate through a beam splitter 5, are incident into the objective lens 6 and are collected on a signal recording surface of the optical disc 102.

The fluxes of light reflected by the signal recording surface are contrarily returned, are penetrated through the objective lens 6, are reflected by the beam splitter 5 and are branched from an optical path which is returned to the semiconductor laser 3. The fluxes of light reflected by the beam splitter 5 are collected by a light collecting lens 9 and is incident into an optical detector 10 which an optical detecting part includes. This optical detecting part includes the optical detector 10 and an operating apparatus 11 which processes operation according to an output signal which is outputted from the optical detector 10. In the optical detecting part, control error signals such as a focus error and a tracking error signal are obtained by the operating apparatus 11. The focus error signal is the signal showing a distance in the direction of the optical axis of the respective objective lens 6 between a point for collecting light of the fluxes of light by the objective lens 6 and the signal recording surface. The tracking error signal is the signal showing a distance in the direction rectangular to the direction of a recording track between the point for collecting light of the fluxes of light bycording track on which an information signal is recorded on the signal recording surface. These control error signals are transmitted to an actuator 8. The actuator 8 supports movably the objective lens 6, and positions the point for collecting the fluxes of light by the objective lens on the recording track by moving the respective objective lens according to the each control error signal.

Here, if using a disc scue servo mechanism, a comatic aberration correction plate which the scue servo mechanism includes may be positioned between the semiconductor laser 3 and the beam splitter 5, or between the respective beam splitter 5 and the objective lens 6. The scue servo mechanism includes a disc scue sensor which is installed in a different way and the comatic aberration correction plate.

The disc scue sensor is a sensor for detecting an angle between the objective lens 6 of the single recording surface of the optical disc 102 and the optical axis. The comatic aberration plate is disposed on the optical path of the fluxes of light, and cancels comatic aberration caused by the gradient of the optical disc by generating the comatic aberration by moving the comatic aberration plate in the direction rectangular to the optical axis of the fluxes of light. The comatic aberration plate is controlled to move according to the output signal from the disc scue sensor.

The optical pick-up apparatus can be formed as an apparatus which writes/reads out an information signal to an optical disc 102 that the disc substrate 101 is less than 0.6 mm thick. Thus, when the disc substrate 101 is thin, it is possible to reduce influence of the comatic aberration due to the gradient of the optical disc 102. Therefore, when thickness of the disc substrate 101 of the optical disc 102 is different from thickness of the disc substrate of the conventional optical disc, the information signal may be written/read out to both of the respective optical disc 102 and the conventional optical disc by gihe degree of diffraction as a first surface of the objective lens 6 is a surface of a diffraction type lens integral construction, and by switching mechanically by establishing the objective lens 6 according to the present invention and the conventional objective lens.

EXAMPLES

Specific embodiments of an objective lens according to the present invention will be described as follows. In each embodiment, a disc substrate 101 is made of Polycarbonate (refractive index: 1.581637).

Example 1

An example of design using BaCD5 (manufactured by HOYA Co., Ltd.).

An example of design using BaCD5 (manufactured by HOYA Co., Ltd.) (refractive index: 1.586422) is shown as follows. In this example of the design, we find that:

$$\frac{d}{R_1} = 0.811 \frac{d}{F} = 0.635 \frac{d_2}{F} = 0, \frac{n(n-1)d_1}{R_1} = 0.994 \quad \text{[expression 55]}$$

Figure 10:
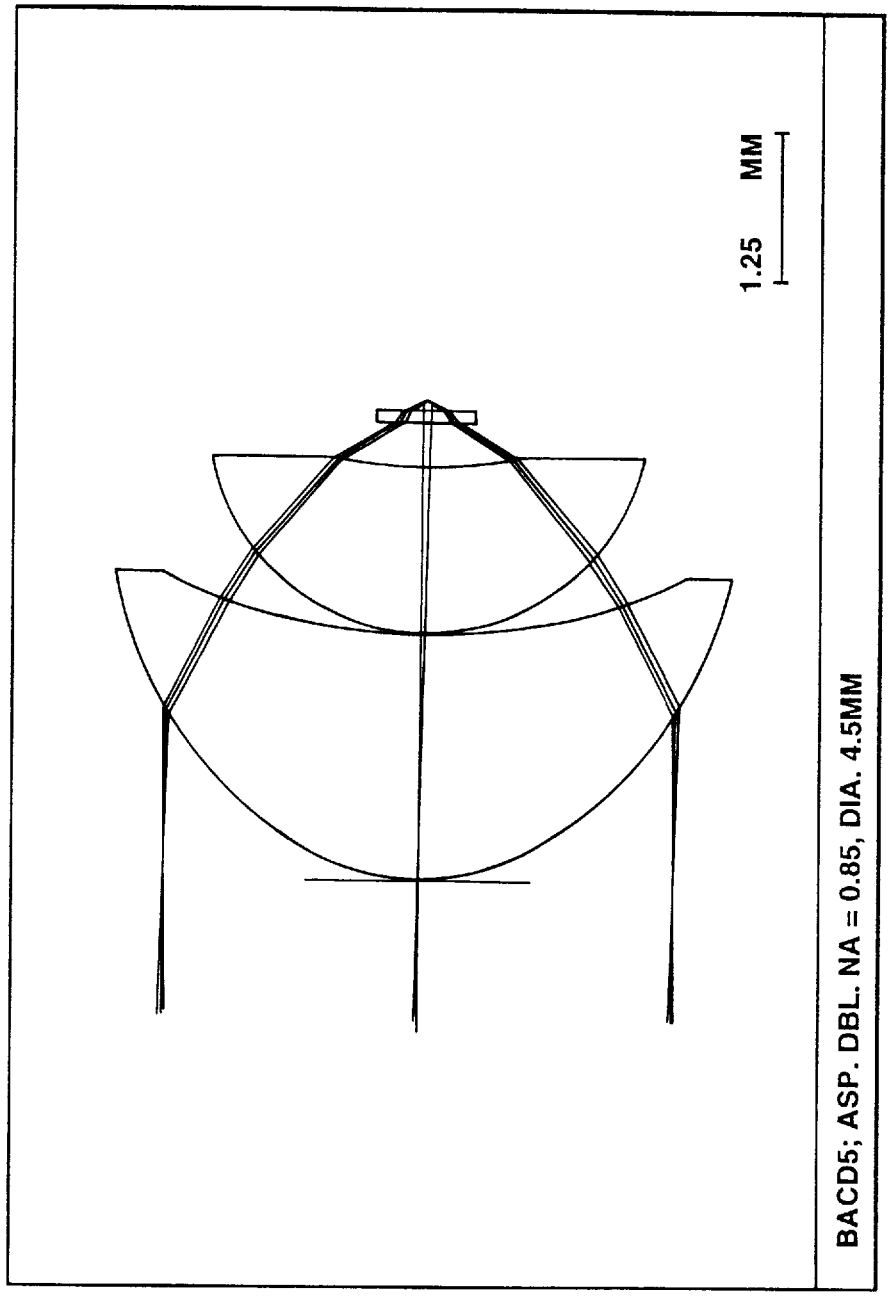
FIG. 10 is a side view showing an optical path in [Example 1]
Figure 11:
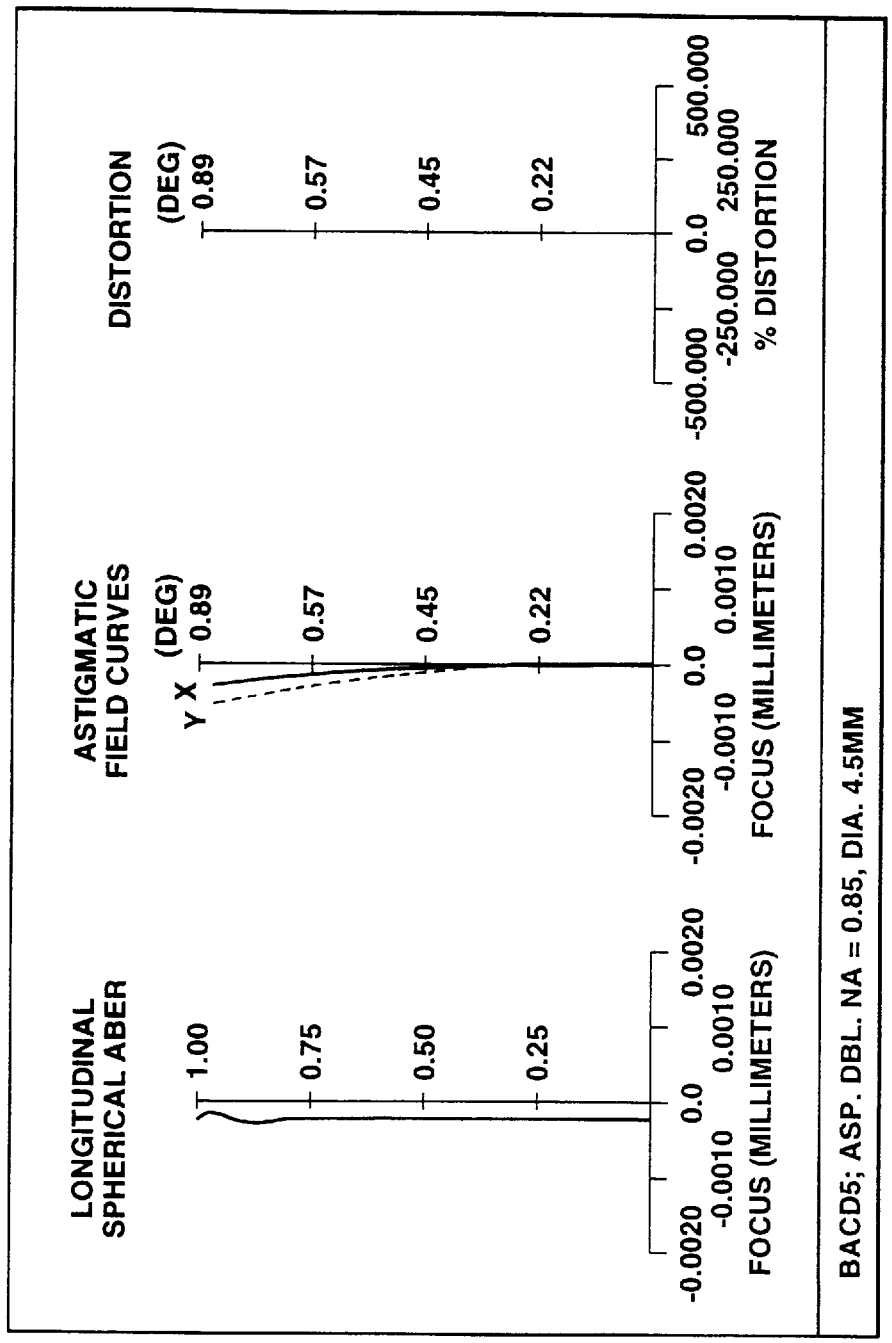
FIG. 11 is a graph showing vertical aberration in [Example 1]
Figure 12:
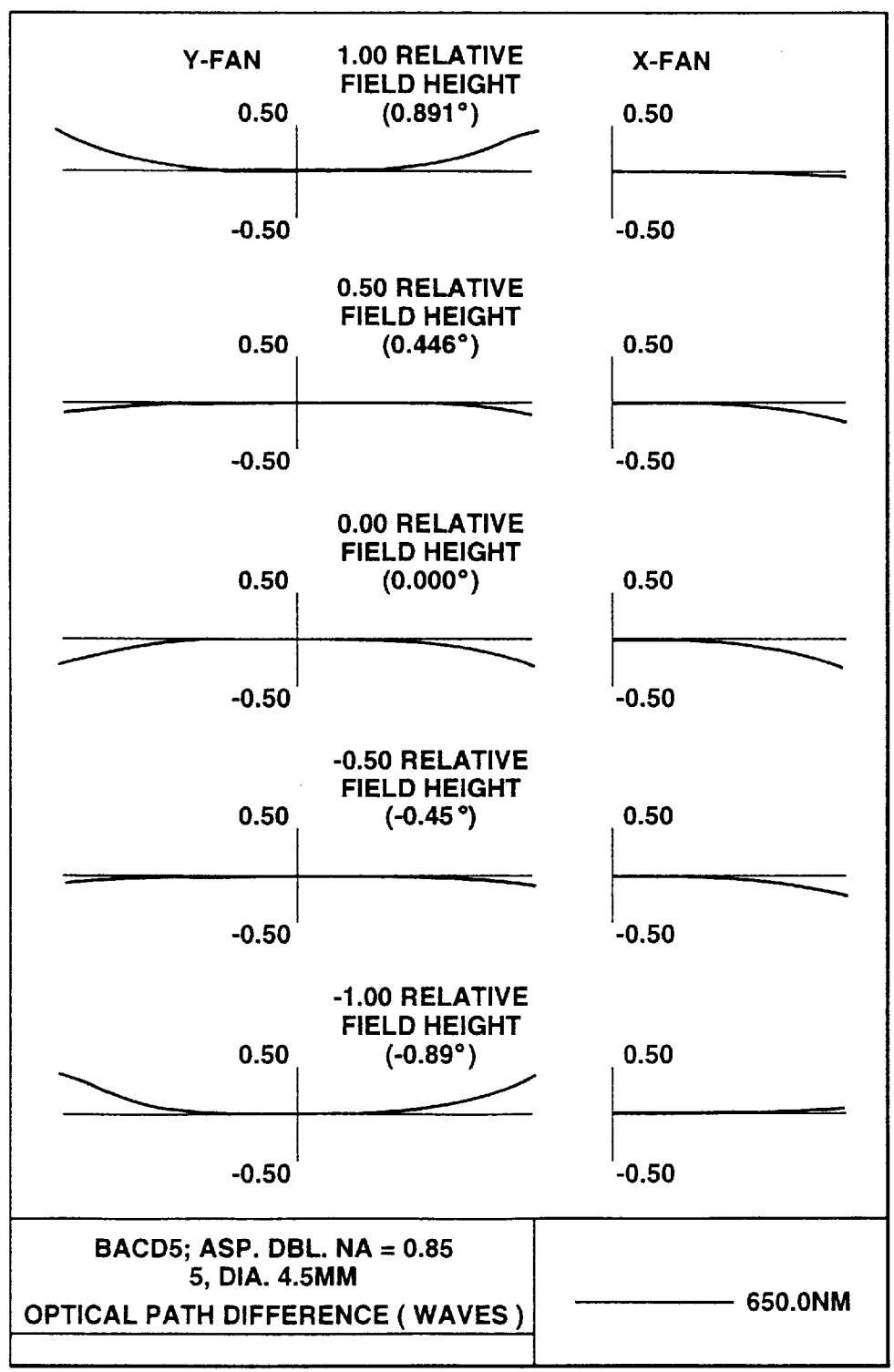
FIG. 12 is a graph showing horizontal aberration in [Example 1]

An optical path is shown in FIG. 10. A view of longitudinal aberration is shown in FIG. 11. A view of horizontal aberration is shown in FIG. 12. Requirements of design are as follows.

Wavelength of Design: 650 nm

Effective Focal Length F: 2.5716 mm

Numeral Aperture: 0.85

TABLE 1

Forms of Surfaces and Intervals between Surfaces

|  | Radiuses of curvature | Intervals of Surfaces | Glass Materials |
|---|---|---|---|
| First Surface | 2.01222 | 2.15 | BACD5_HOYA |
| Second Surface | 7.36849 | 0 |  |
| Third Surface | 2.00000 | 1.450 | BACD5_HOYA |
| Forth Surface | 4.06432 | 0.503893 |  |
| Fifth Surface (optical disc substrate) | ∞ | 0.1 | Polycarbonate |
| Surface of Image | ∞ |  |  |

TABLE 2

Non spherical Coefficients

|  | K | A | B |
|---|---|---|---|
| First Non spherical Surface | −0.515678 | 0.159585E-2 | 0.119665E-3 |
| Second Non spherical Surface | 2.998099 | 0.105826E-1 | −0.236471E-2 |
| Third Non spherical Surface | −0.328040 | 0.883551E-2 | 0.313709E-2 |
| Forth Non spherical Surface | 10.0 | 0.306812E-1 | −0.468888E-1 |

|  | C | D |
|---|---|---|
| First Non spherical Surface | 0.250300E-4 | 0.325711E-6 |
| Second Non spherical Surface | 0.426412E-3 | −0.366530E-4 |
| Third Non spherical Surface | −0.616805E-3 | 0.587869E-3 |
| Forth Non spherical Surface | 0.10000E-2 | 0.10000E-3 |

TABLE 3

Three Degree Aberration Coefficient of Each Surface

|  | Spherical Aberration (Spherical Term) | Spherical Aberration (Non spherical Term) | Spherical Aberration (Sum of Each Surface) |
|---|---|---|---|
| First Surface | −0.384 | 0.398 | 0.014 |
| Second Surface | −0.027 | 0.097 | 0.070 |
| Third Surface | 0.002 | −0.031 | −0.029 |
| Fourth Surface | −0.074 | 0.007 | −0.067 |
| Fifth Surface | 0.031 |  | 0.031 |
| Sixth Surface | −0.019 |  | −0.019 |
| Sum | −0.471 | 0.471 | −0.003 |

TABLE 3-continued

Three Degree Aberration Coefficient of Each Surface

|  | Comatic Aberration (Spherical Term) | Comatic Aberration (Nonspherical Term) | Comatic Aberration (The Sum of Each Surface) |
| --- | --- | --- | --- |
| First Surface | −0.016 | 0 | −0.016 |
| Second Surface | 0.007 | 0.003 | 0.010 |
| Third Surface | 0.001 | −0.002 | −0.001 |
| Fourth Surface | 0.007 | 0.001 | 0.008 |
| Fifth Surface | −0.002 |  | −0.002 |
| Sixth Surface | 0.001 |  | 0.001 |
| Sum | −0.002 | 0.002 | −0.000 |

Example 2

An example of design using LaC13 (manufactured by HOYA Co., Ltd.).

An example of design using LaC13 (manufactured by HOYA Co., Ltd.) (refractive index: 1.689867) is shown as follows. In this example of the design, as follows:

$$\frac{d}{R_1} = 0.728 \frac{d}{F} = 0.615 \frac{d_2}{F} = 0, \frac{n(n-1)d_1}{R_1} = 1.003 \quad \text{[expression 56]}$$

Figure 13:
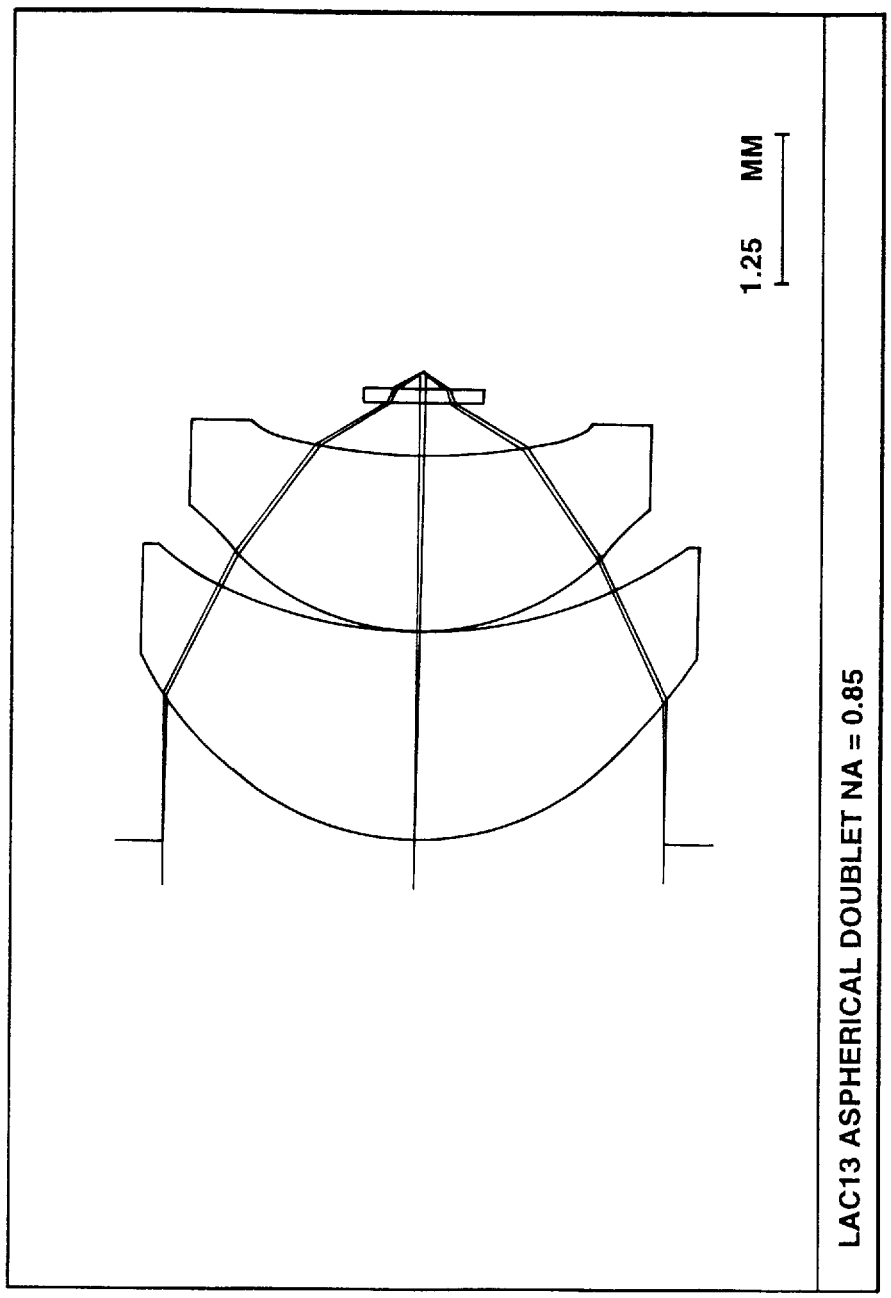
FIG. 13 is side view showing an optical path in [Example 2]
Figure 14:
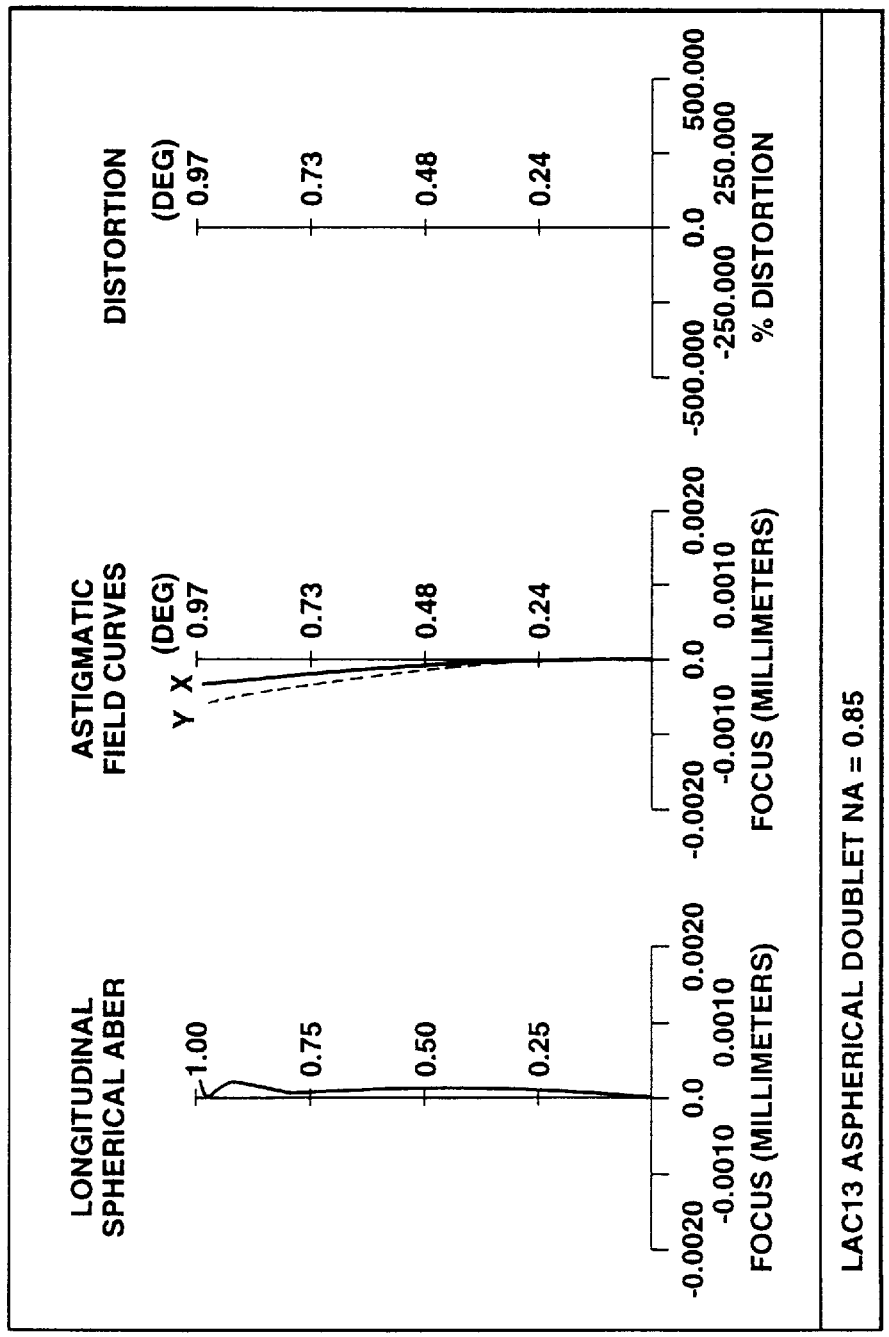
FIG. 14 is a graph showing vertical aberration in [Example 2]
Figure 15:
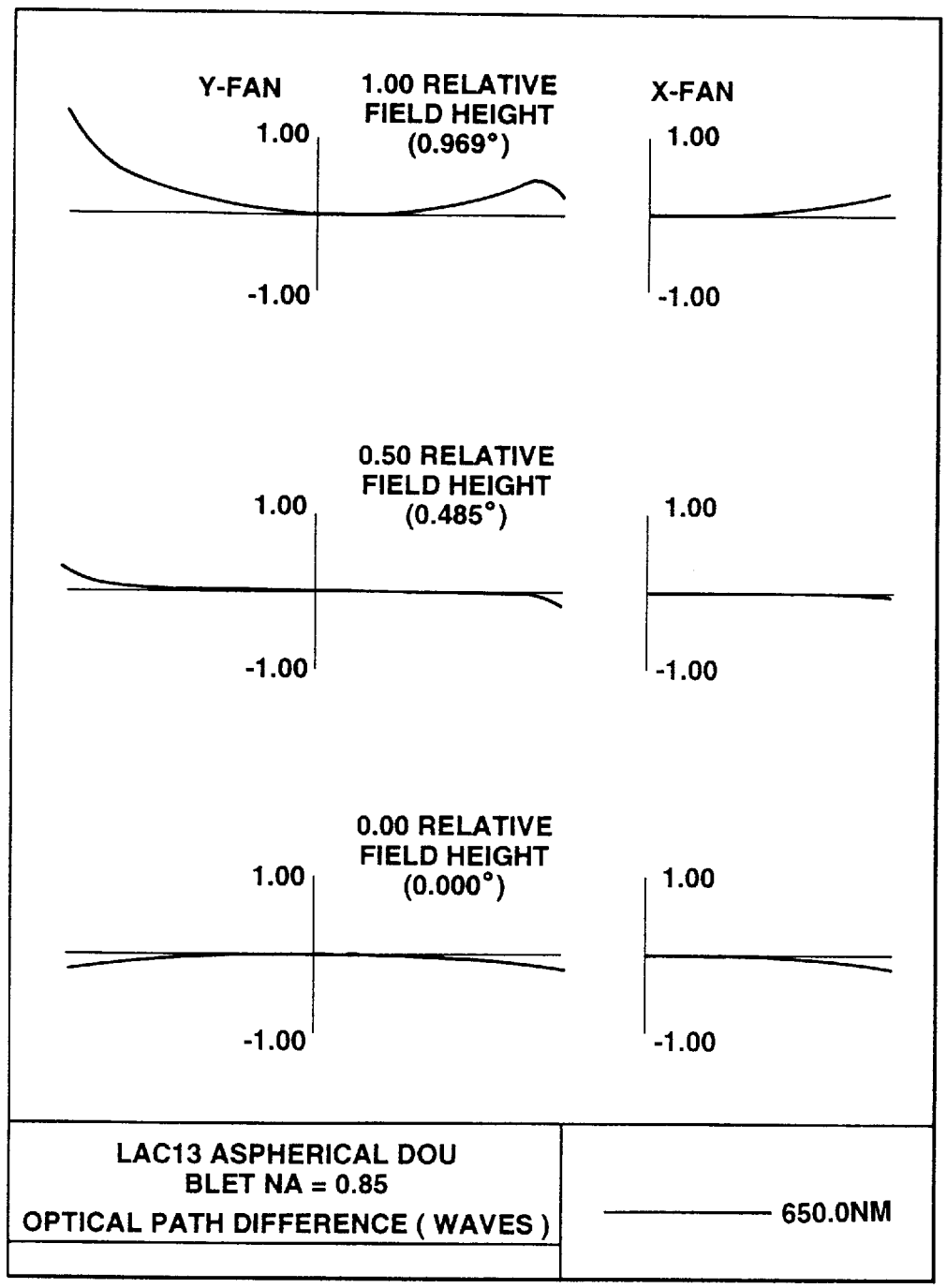
FIG. 15 is a graph showing horizontal aberration in [Example 2]

An optical path is shown in FIG. 13. A view of longitudinal aberration is shown in FIG. 14. A view of horizontal aberration is shown in FIG. 15. Requirements of the design are as follows.

Wavelength of design: 650 nm
Effective Focal Length F: 2.3645 mm
Numeral Aperture: 0.85

TABLE 4

Forms of Surfaces and Intervals between Surfaces

|  | Radiuses of curvature | Intervals of Surfaces | Glass Materials |
| --- | --- | --- | --- |
| First Surface | 2.00 | 1.72 | LaC13_HOYA |
| Second Surface | 3.84433 | 0.00 |  |
| Third Surface | 2.00 | 1.44 | LaC13_HOYA |
| Forth Surface | 6.18477 | 0.559759 |  |
| Fifth Surface (optical disc substrate) | ∞ | 0.1 | Polycarbonate |
| Surface of Image | ∞ |  |  |

TABLE 5

Non spherical Coefficients

|  | K | A | B |
| --- | --- | --- | --- |
| First Non spherical Surface | −0.511722 | 0.219692E-2 | 0.368856E-3 |
| Second Non spherical Surface | 1.731246 | 0.452048E-2 | −0.204044E-2 |
| Third Non spherical Surface | −0.247906 | 0.642644E-2 | −0.116692E-2 |
| Forth Non spherical Surface | 0 | 0.516720E-1 | −0.514334E-1 |

TABLE 5-continued

Non spherical Coefficients

|  | C | D |
| --- | --- | --- |
| First Non spherical Surface | −0.891366E-4 | −0.889615E-5 |
| Second Non spherical Surface | −0.927365E-3 | 0.187339E-3 |
| Third Non spherical Surface | 0.323202E-2 | −0.105916E-2 |
| Forth Non spherical Surface | −0.119820E-1 | 0.168253E-1 |

TABLE 6

Three Degree Aberration Coefficient of Each Surface

|  | Spherical Aberration (Spherical Term) | Spherical Aberration (Non spherical Term) | Spherical Aberration (Sum of Each Surface) |
| --- | --- | --- | --- |
| First Surface | −0.290 | 0.307 | 0.017 |
| Second Surface | −0.002 | 0.078 | 0.076 |
| Third Surface | 0.004 | −0.024 | −0.020 |
| Fourth Surface | −0.097 | 0.013 | −0.084 |
| Fifth Surface | 0.037 |  | 0.037 |
| Sixth Surface | −0.025 |  | −0.025 |
| Sum | −0.373 | 0.374 | 0.001 |

|  | Comatic Aberration (Spherical Term) | Comatic Aberration (Nonspherical Term) | Comatic Aberration (The Sum of Each Surface) |
| --- | --- | --- | --- |
| First Surface | −0.015 | 0 | −0.015 |
| Second Surface | 0.001 | 0.003 | 0.004 |
| Third Surface | 0.002 | −0.001 | 0.001 |
| Fourth Surface | 0.008 | 0.002 | 0.010 |
| Fifth Surface | −0.002 |  | −0.002 |
| Sixth Surface | 0.002 |  | 0.002 |
| Sum | −0.004 | 0.004 | 0.001 |

Example 3

An example of design using LaF20 (SCHOTT).

An example of design using LaF20 (manufactured by HOYA Co., Ltd.) (refractive index: 1.739431) is shown as follows. In this example of design, as follows:

$$\frac{d}{R_1} = 0.745 \frac{d}{F} = 0.625 \frac{d_2}{F} = 0, \frac{n(n-1)d_1}{R_1} = 1.116 \quad \text{[expression 57]}$$

Figure 16:
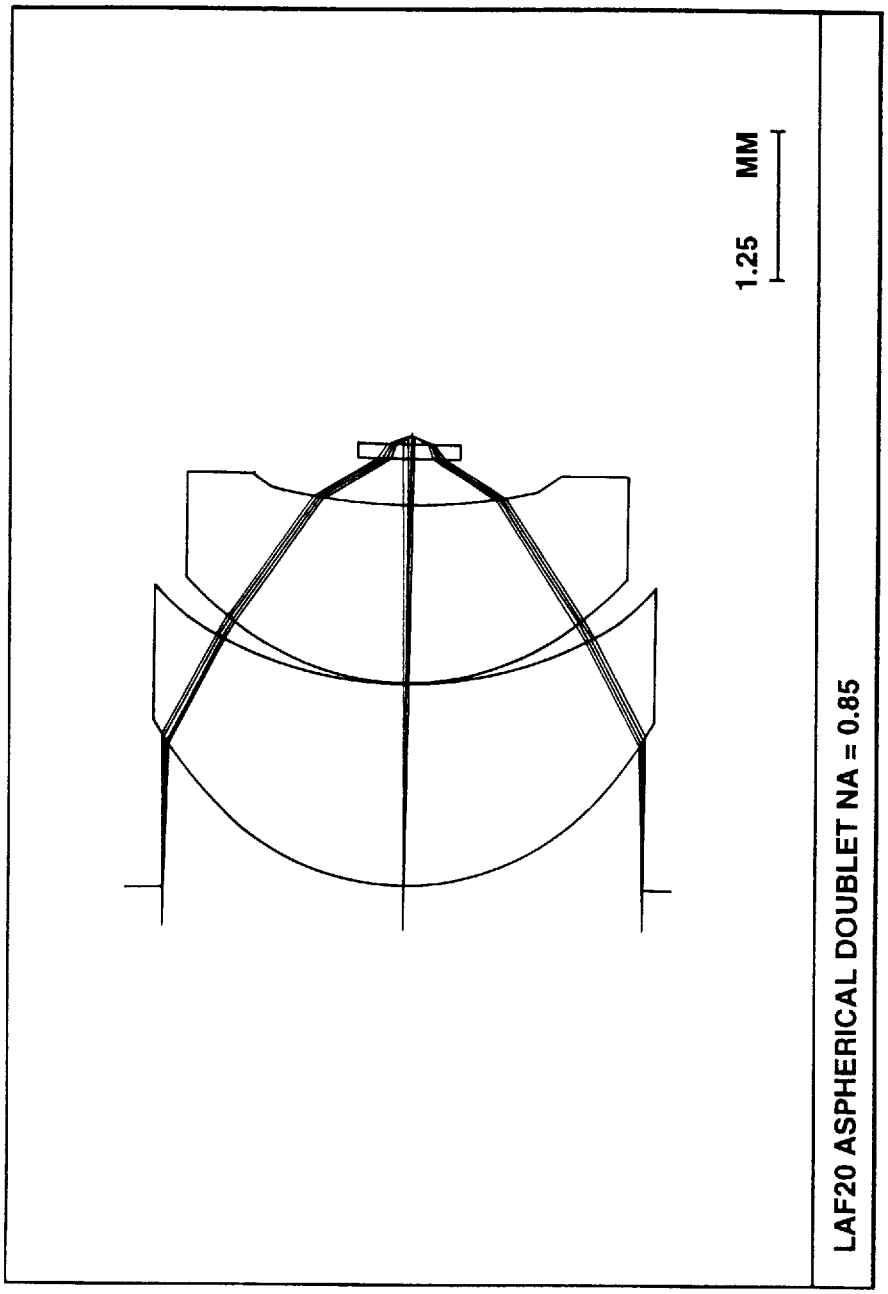
FIG. 16 is side view showing an optical path in [Example 3]
Figure 17:
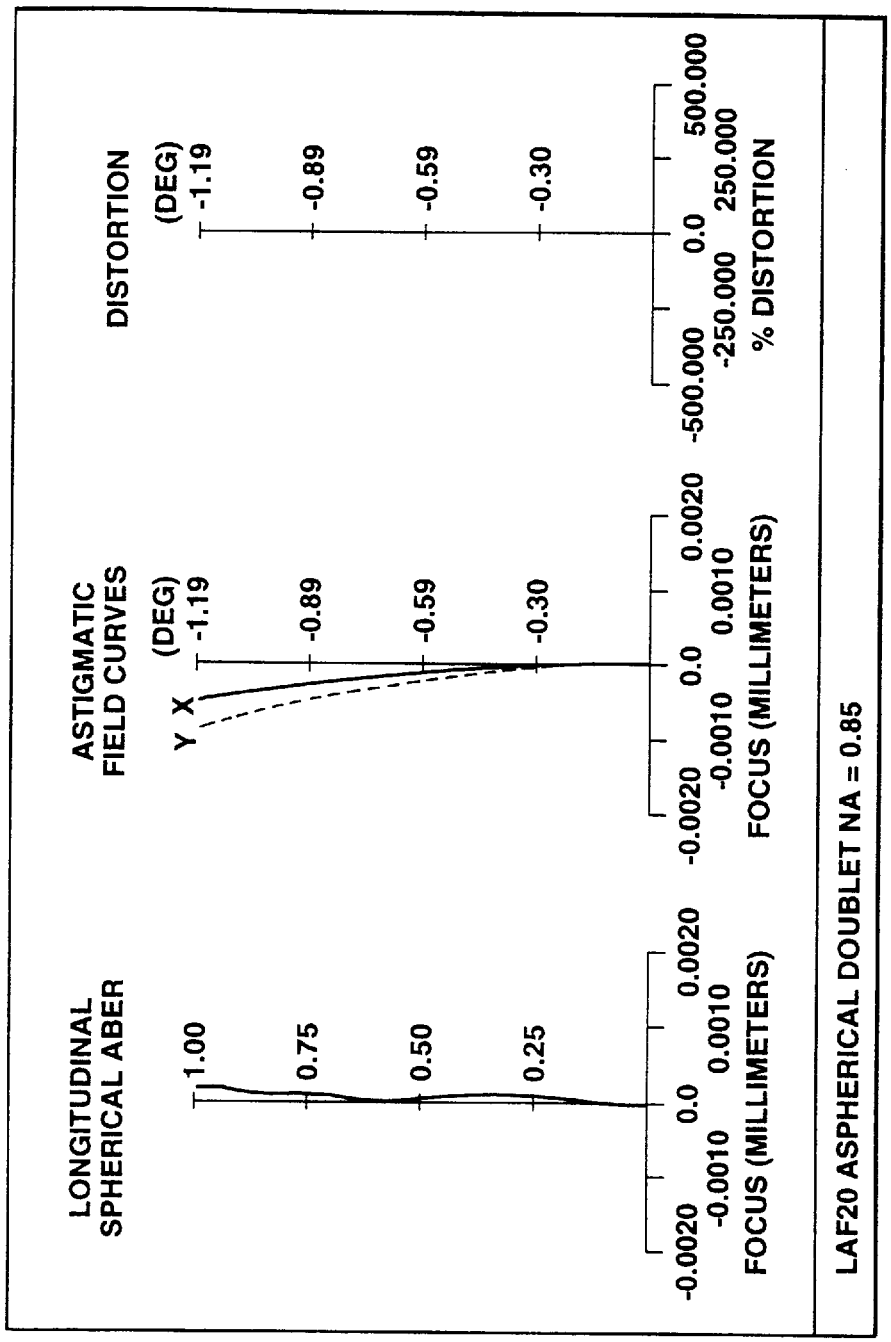
FIG. 17 is a graph showing vertical aberration in [Example 3]
Figure 18:
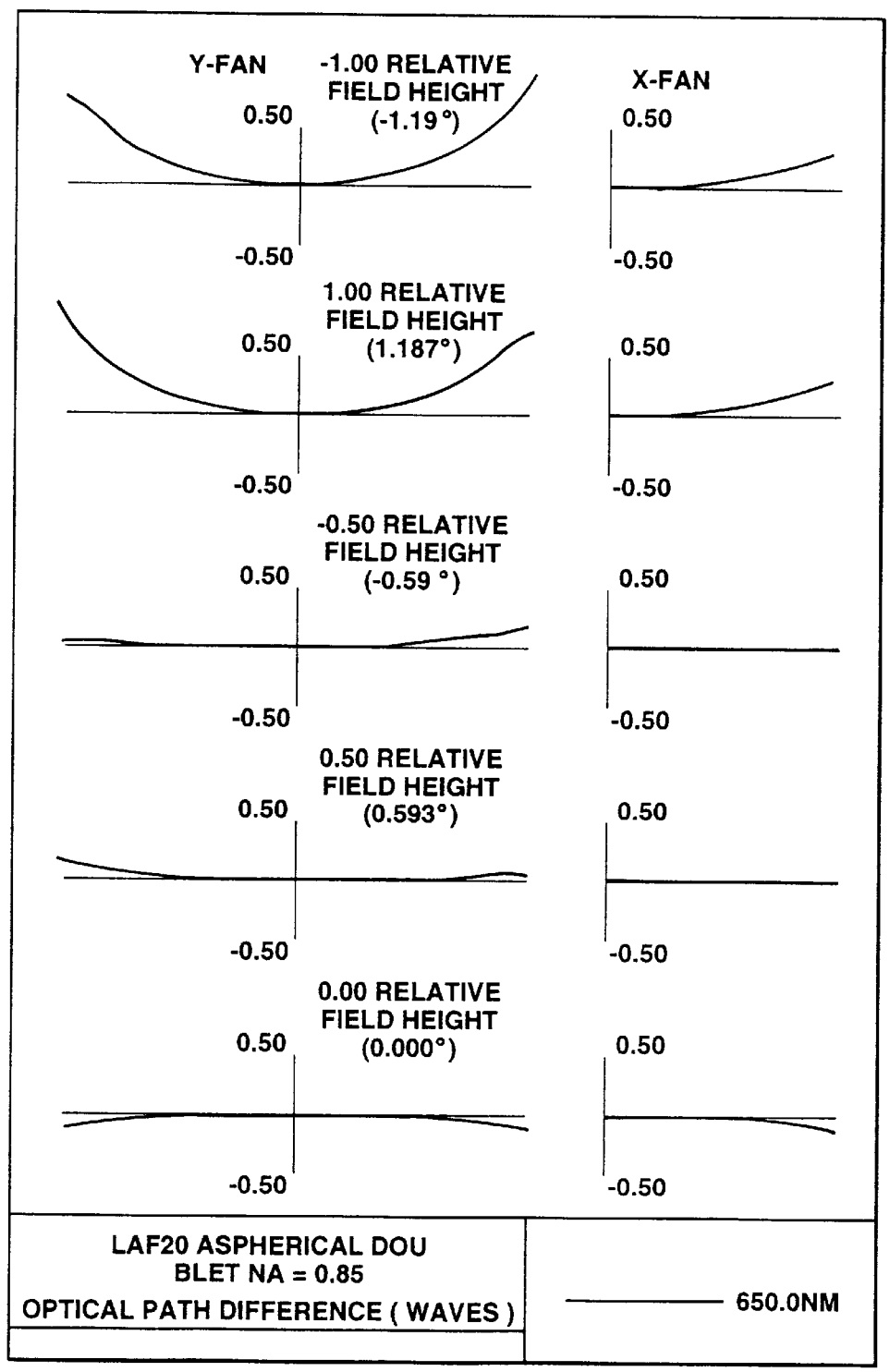
FIG. 18 is a graph showing horizontal aberration in [Example 3]

An optical path is shown in FIG. 16. A view of longitudinal aberration is shown in FIG. 17. A view of horizontal aberration is shown in FIG. 18 Requirements of design are as follows.

Wavelength of Design: 650 nm

Effective Focal Length F: 2.4137 mm

Numeral Aperture: 0.85

TABLE 7

Forms of Surfaces and Intervals between Surfaces

|  | Radiuses of curvature | Intervals of Surfaces | Glass Materials |
|---|---|---|---|
| First Surface | 2.02761 | 1.76 | LaF20_HOYA |
| Second Surface | 3.60629 | 0.00 |  |
| Third Surface | 2.25852 | 1.56 | LaF20_HOYA |
| Forth Surface | 6.29051 | 0.503269 |  |
| Fifth Surface (optical disc substrate) | ∞ | 0.1 | Polycarbonate |
| Surface of Image | ∞ |  |  |

TABLE 8

Non spherical Coefficients

|  | K | A | B |
|---|---|---|---|
| First Non spherical Surface | −0.500452 | 0.238656E-2 | 0.520258E-3 |
| Second Non spherical Surface | 1.796200 | 0.444639E-2 | −0.120931E-2 |
| Third Non spherical Surface | −0.27498 | 0.570798E-2 | −0.229035E-2 |
| Forth Non spherical Surface | 0 | 0.636039E-1 | −0.563949E-1 |

|  | C | D |
|---|---|---|
| First Non spherical Surface | −0.404431E-4 | −0.505013E-5 |
| Second Non spherical Surface | −0.865357E-3 | 0.954777E-4 |
| Third Non spherical Surface | 0.314339E-2 | −0.849576E-3 |
| Forth Non spherical Surface | −0.308782E-1 | 0.309499E-1 |

TABLE 9

Three Degree Aberration Coefficient of Each Surface

|  | Spherical Aberration (Spherical Term) | Spherical Aberration (Non spherical Term) | Spherical Aberration (Sum of Each Surface) |
|---|---|---|---|
| First Surface | −0.306 | 0.316 | 0.010 |
| Second Surface | −0.003 | 0.090 | 0.087 |
| Third Surface | 0.001 | −0.027 | −0.026 |
| Fourth Surface | −0.093 | 0.012 | −0.081 |
| Fifth Surface | 0.031 |  | 0.031 |
| Sixth Surface | −0.019 |  | −0.019 |
| Sum | −0.389 | 0.391 | 0.002 |

TABLE 9-continued

Three Degree Aberration Coefficient of Each Surface

|  | Comatic Aberration (Spherical Term) | Comatic Aberration (Nonspherical Term) | Comatic Aberration (The Sum of Each Surface) |
|---|---|---|---|
| First Surface | 0.019 | 0 | 0.019 |
| Second Surface | −0.002 | −0.004 | −0.006 |
| Third Surface | −0.001 | 0.001 | 0.000 |
| Fourth Surface | −0.010 | −0.002 | −0.012 |
| Fifth Surface | 0.002 |  | 0.002 |
| Sixth Surface | −0.001 |  | −0.001 |
| Sum | 0.007 | −0.005 | 0.002 |

Example 4

An example of design using PMMA (Polymethylmethacrylate).

An objective lens according to the present invention can be formed by using plastic injection molding. An example of design using PMMA (Polymethylmethacrylate) (refractive index: 1.492) is shown as follows. In this example of design, as follows:

$$\frac{d}{r_1} = 0.743 \quad \frac{d}{F} = 0.550 \quad \frac{d_2}{F} = 0.103,$$ [expression 58]

$$\frac{n(n-1)d_1}{R_1} = 0.657$$

Figure 19:
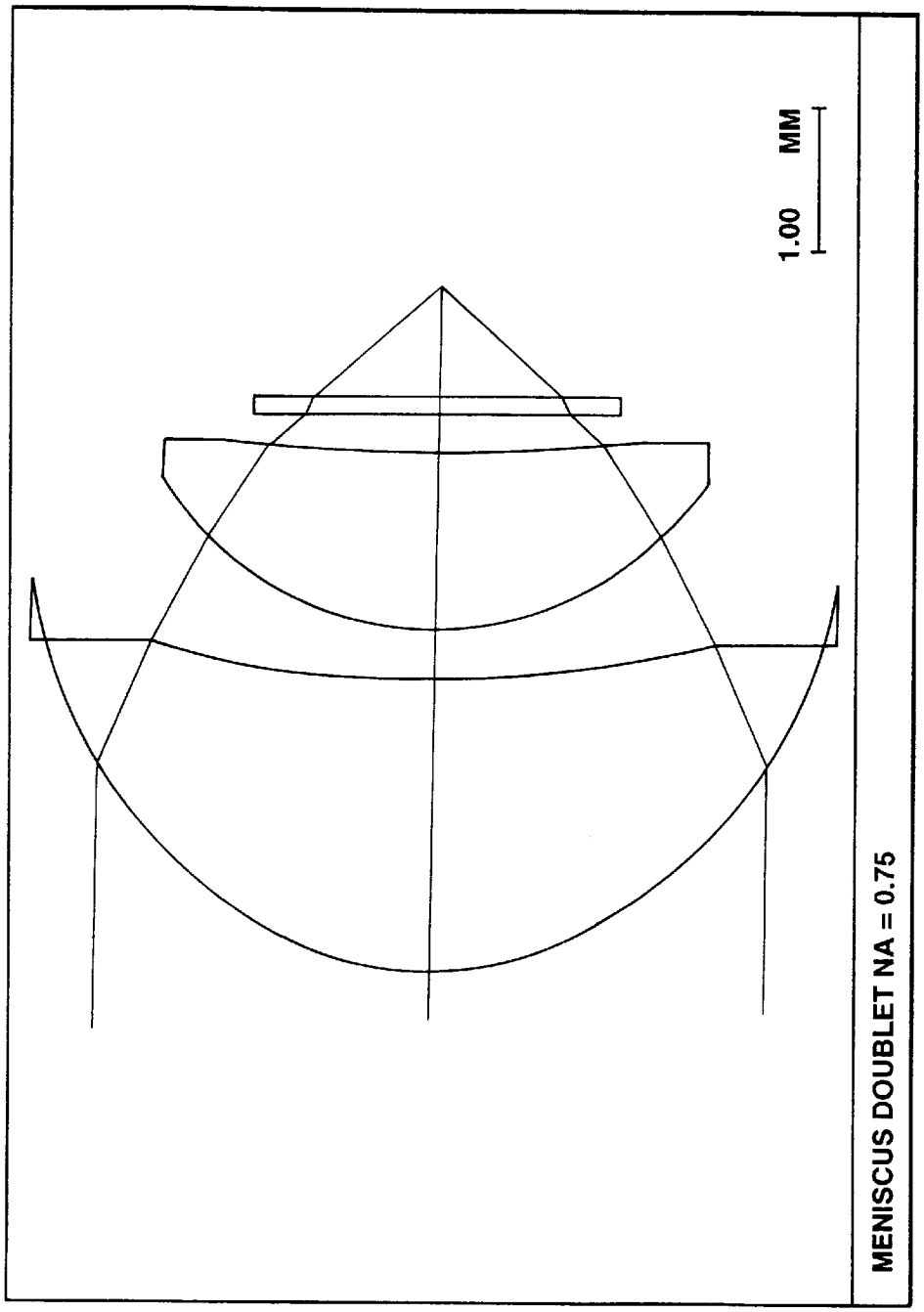
FIG. 19 is side view showing an optical path in [Example 4]
Figure 20:
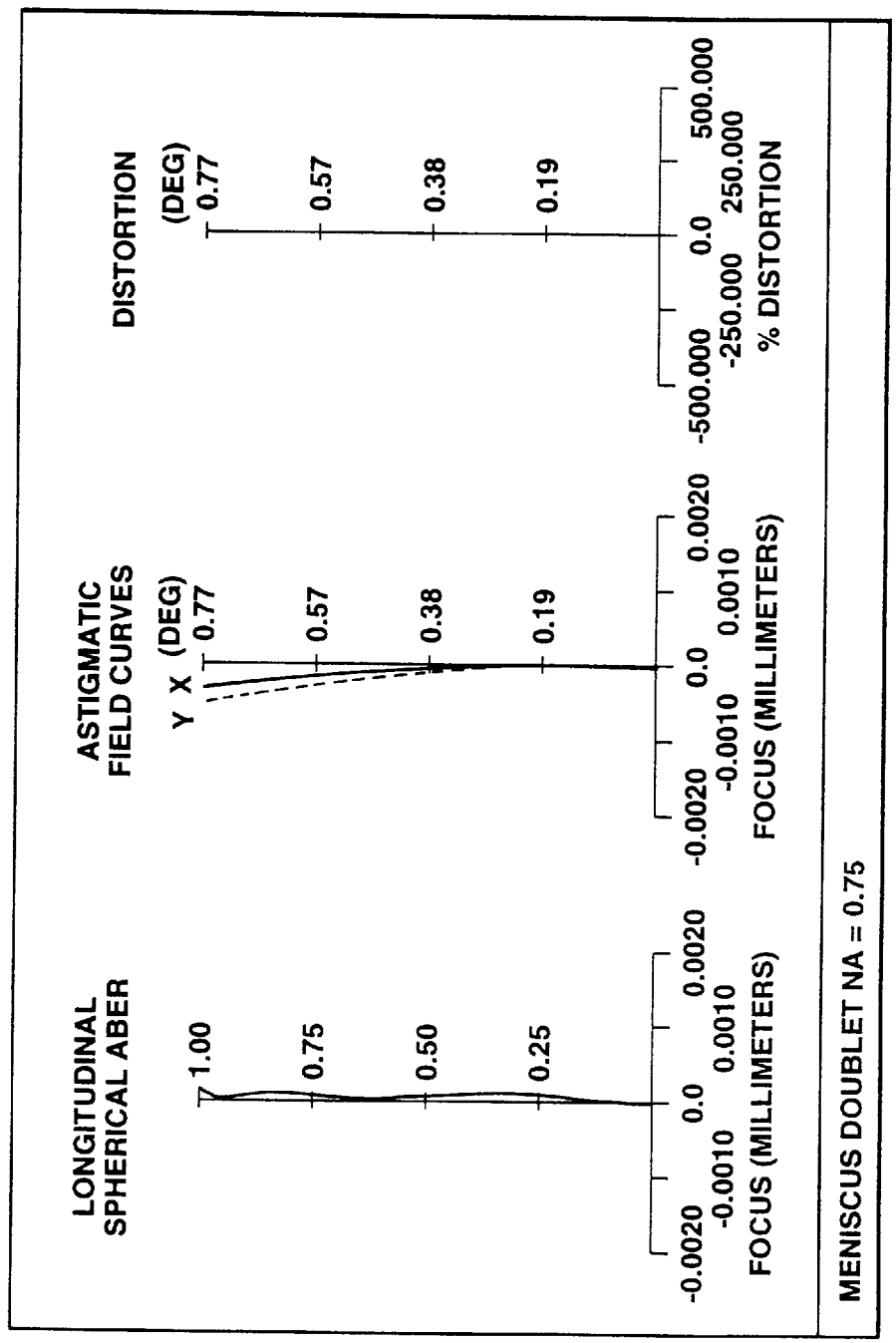
FIG. 20 is a graph showing vertical aberration in [Example 4]
Figure 21:
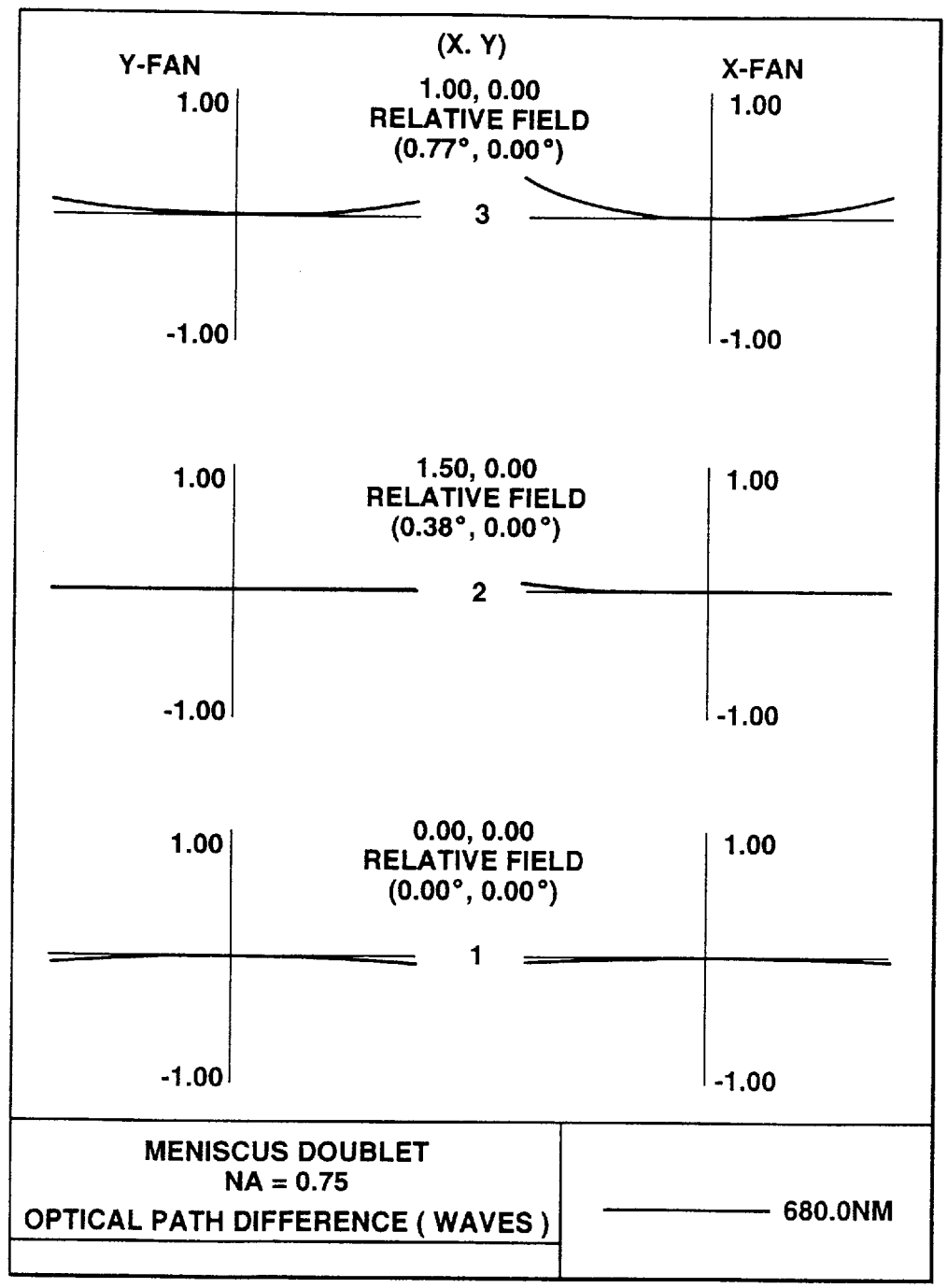
FIG. 21 is a graph showing horizontal aberration in [Example 4].

An optical path is shown in FIG. 19. A view of longitudinal aberration is shown in FIG. 20. A view of horizontal aberration is shown in FIG. 21. In this example, requirements of [expression 5] and [expression 6] are not satisfied. Therefore, decentering of assembling between elements and so on to some extent is weak. However, as refractive index of plastic is generally low, it is possible to ease accuracy of a surface.

Requirements of design are as follows.

Wavelength of Design: 650 nm

Effective Focal Length F: 2.9939 mm

Numeral Aperture: 0.75

TABLE 10

Forms of Surfaces and Intervals between Surfaces

|  | Radiuses of curvature | Intervals of Surfaces | Glass Materials |
|---|---|---|---|
| First Surface | 2.21506 | 2.000000 | PMMA |
| Second Surface | 13.17529 | 0.310000 |  |
| Third Surface | 2.03612 | 1.23 | PMMA |
| Forth Surface | 11.72249 | 1.00 |  |
| Fifth Surface (optical disc substrate) | ∞ | 0.1 | Polycarbonate |
| Surface of Image | ∞ |  |  |

TABLE 11

Non spherical Coefficients

|  | K | A | B |
|---|---|---|---|
| First Non spherical Surface | −0.351183 | −0.967009E-3 | −0.617453E-4 |
| Second Non spherical Surface | 29.593850 | 0.484804E-2 | −0.363148E-4 |
| Third Non spherical Surface | −0.282955 | 0.2031169E-2 | 0.146511E-3 |
| Forth Non spherical Surface | −100.0000 | −0.100000E-2 | −0.100000E-2 |

|  | C | D |
|---|---|---|
| First Non spherical Surface | 0.263335E-5 | −0.251525E-5 |
| Second Non spherical Surface | 0.890286E-5 | −0.325249E-5 |
| Third Non spherical Surface | −0.335153E-3 | 0.107159E-3 |
| Forth Non spherical Surface | 0.290658E-2 | −0.944754E-3 |

TABLE 12

Three Degree Aberration Coefficient of Each Surface

|  | Spherical Aberration (Spherical Term) | Spherical Aberration (Non spherical Term) | Spherical Aberration (Sum of Each Surface) |
|---|---|---|---|
| First Surface | −0.344 | 0.332 | −0.012 |
| Second Surface | −0.023 | 0.105 | 0.082 |
| Third Surface | 0.006 | 0.025 | 0.031 |
| Fourth Surface | −0.098 | −0.009 | −0.107 |
| Fifth Surface | 0.103 |  | 0.103 |
| Sixth Surface | −0.095 |  | −0.095 |
| Sum |  |  | 0.001 |

|  | Comatic Aberration (Spherical Term) | Comatic Aberration (Nonspherical Term) | Comatic Aberration (The Sum of Each Surface) |
|---|---|---|---|
| First Surface | −0.014 | 0.000 | −0.014 |
| Second Surface | 0.003 | 0.004 | 0.007 |
| Third Surface | 0.002 | 0.001 | 0.003 |
| Fourth Surface | 0.005 | −0.001 | 0.004 |
| Fifth Surface | −0.004 |  | −0.004 |
| Sixth Surface | 0.004 |  | 0.004 |
| Sum |  |  | 0.000 |

As above mentioned, the present invention realizes an objective lens that a numeral aperture (NA) is more than 0.7 as a lens of combination of two non spherical surfaces, and it is possible to use practically an optical recording medium of higher information recording density by using this objective lens in a recording/reproducing apparatus.

That is to say, in the present invention, it is possible to realize the objective lens of the high numeral aperture (NA) by a comparatively easy construction of a set of two pieces. If about two pieces, it is possible to control loss of amount of light and flare due to reflection and absorption by internal surface.

Further, the objective lens according to the present invention is possible to secure the size to drive by a comparatively small-sized actuator and a working distance that it is possible to use as the objective lens for an optical disc.

Further, the objective lens according to the present invention can secure sufficient tolerance for errors of manufacturing and assembling.

Further, as the objective lens according to the present invention can be also formed as a non spherical mold lens, it is possible to mass-produce and expect to make a cost low.

Furthermore, in the objective lens according the present invention, as an incident angle on the forth surface is smaller than an immersion lens structure, it is possible to make Frenel reflection loss small.

What is claimed is:

1. An objective lens comprising a first lens disposed on the side of an object and having a first surface on the side of the object and a second surface on the side of an image, and a second lens disposed on the side of the image and having a third surface on the side of the object and a fourth surface on the side of image;

wherein a non spherical form of said surface of a lens system is shown as a rotating body around an optical axis of a curve shown by the following expression:

$$x = \frac{ch^2}{1 + \sqrt{(1 - (1+k)c^2 h^2)}} + Ah^4 + bH^6 + Ch^8 + Dh^{10} \quad \text{[expression 1]}$$

wherein h is height from the optical axis;

x is a distance from a tangent plane of the top of the non spherical surface of the point on the non spherical surface that the height from the optical axis is h;

c is curvature of the top of the non spherical surface;

k is a cone constant, A is a non spherical coefficient of a fourth degree;

B is the non spherical coefficient of a sixth degree;

C is the non spherical coefficient of a eighth degree and

D is the non spherical coefficient of a tenth degree;

wherein the distance on the side of the image along the optical axis is a positive number and that on the side of the subject is a negative number, a radius of curvature of the surface is a positive number when the center of curvature is on the side of the image and that is a negative number when the center of curvature is on the side of the object, and refractive power of the surface is a positive number when the center of curvature is on the side of the image and that is a negative number when the center of curvature is on the side of the object, wherein said first surface has positive refractive power and a rotating ellipse surface satisfying $-1 \leq k < 0$ about a cone constant k, and the following expression is satisfied:

$$n - 1.25 < \frac{d}{F} \quad \text{[expression 2]}$$

$$0.5 < \frac{F}{R_1} < \frac{n^2}{n^2 - 1} \quad \text{[expression 3]}$$

$$0.6 R_1 < d < \frac{-(n-1)\frac{F}{R_1} + n}{(n-1)\frac{F}{R_1}\left[(n-1)(n^2 - n - 1)\frac{F}{R_1} + 1\right]} \quad \text{[expression 4]}$$

wherein n is the refractive index of glass materials which said first lens comprises;

$R_1$ is the radius of curvature of said first surface;

d is the main plane interval of the total of said each lens and

F is an effective focal distance.

2. The objective lens according to claim 1, wherein said second surface is a rotating ellipse surface which has the negative refractive power and that a cone constant k is larger than 0, said third surface is a rotating ellipse surface which has the positive refractive power and that a cone constant k is larger than −1 and less than 0, and a numeral aperture is larger than 0.7.

3. The objective lens according to claim 1, wherein the following expressions are satisfied:

$$\frac{d_2}{F} < 0.1 \quad \text{[expression 5]}$$

$$0.8 < n_1 d_1 \frac{n_1 - 1}{R_1} < 1.3 \quad \text{[expression 6]}$$

wherein a surface interval $d_1$ is between said first and said second surface and $d_2$ is between said second and said third surface.

4. A recording/reproducing apparatus comprising a light source and an objective lens;

wherein said objective lens comprising a first lens disposed on the side of an object and having a first surface on the side of the object and a second surface on the side of an image, and a second lens disposed on the side of the image and having a third surface on the side of the object and a fourth surface on the side of image image;

wherein a non spherical form of said surface of a lens system is shown as a rotating body around an optical axis of a curve shown by the following expression:

$$x = \frac{ch^2}{1 + \sqrt{(1 - (1+k)c^2 h^2)}} + Ah^4 + Bh^6 + Ch^8 + Dh^{10} \quad \text{[expression 7]}$$

wherein h is height from the optical axis;

x is a distance from a tangent plane of the top of the non spherical surface of the point on the non spherical surface that the height from the optical axis is h;

c is curvature of the top of the non spherical surface;

k is a cone constant, A is a non spherical coefficient of a fourth degree;

B is the non spherical coefficient of a sixth degree;

C is the non spherical coefficient of a eighth degree and

D is the non spherical coefficient of a tenth degree;

wherein the distance on the side of the image along the optical axis is a positive number and that on the side of the subject is a negative number, a radius of curvature of the surface is a positive number when the center of curvature is on the side of the image and that is a negative number when the center of curvature is on the side of the object, and refractive power of the surface is a positive number when the center of curvature is on the side of the image and that is a negative number when the center of curvature is on the side of the object, wherein said first surface has positive refractive power and a rotating ellipse surface satisfying $-1 \leq k < 0$ about a cone constant k, and the following expression is satisfied:

$$n - 1.25 < \frac{d}{F} \quad \text{[expression 8]}$$

$$0.5 < \frac{F}{R_1} < \frac{n^2}{n^2 - 1} \quad \text{[expression 9]}$$

$$0.6R_1 < d < \frac{-(n-1)\frac{F}{R_1} + n}{(n-1)\frac{F}{R_1}\left[(n-1)(n^2 - n - 1)\frac{F}{R_1} + 1\right]} \quad \text{[expression 10]}$$

wherein n is the refractive index of glass materials which said first lens comprises;

$R_1$ is the radius of curvature of said first surface;

d is the main plane interval of the total of said each lens and

F is an effective focal distance.

5. The recording/reproducing apparatus according to claim 4 comprising a scue detecting means for detecting a gradient of said objective lens of a signal recording surface of an optical recording medium to an optical axis.

6. The recording/reproducing apparatus according to claim 4, wherein the recording/reproducing apparatus supports said signal recording surface and is used for said optical recording medium that a transparent substrate positioned between said signal recording surface and said objective lens is less than 0.6 mm thick.

* * * * *